United States Patent
Silver et al.

(10) Patent No.: US 10,940,851 B2
(45) Date of Patent: Mar. 9, 2021

(54) DETERMINING WHEEL SLIPPAGE ON SELF DRIVING VEHICLE

(71) Applicant: Waymo LLC, Mountain View, CA (US)

(72) Inventors: David Harrison Silver, San Carlos, CA (US); Jens-Steffen Ralf Gutmann, Cupertino, CA (US); Michael James, Northville, MI (US)

(73) Assignee: Waymo LLC, Mountain View, CA (US)

( * ) Notice: Subject to any disclaimer, the term of this patent is extended or adjusted under 35 U.S.C. 154(b) by 37 days.

(21) Appl. No.: 16/217,531

(22) Filed: Dec. 12, 2018

(65) Prior Publication Data
US 2020/0189567 A1    Jun. 18, 2020

(51) Int. Cl.
*B60W 30/02* (2012.01)
*G05D 1/00* (2006.01)
(Continued)

(52) U.S. Cl.
CPC ............ *B60W 30/02* (2013.01); *B60W 10/04* (2013.01); *B60W 10/18* (2013.01); *B60W 10/20* (2013.01);
(Continued)

(58) Field of Classification Search
CPC ...... B60W 30/02; B60W 10/04; B60W 10/18; B60W 10/20; B60W 2552/00;
(Continued)

(56) References Cited

U.S. PATENT DOCUMENTS 7,016,783 B2    3/2006    Hac et al.
7,124,027 B1    10/2006    Ernst, Jr. et al.
(Continued)

FOREIGN PATENT DOCUMENTS

KR    101696821 B1    2/2017

OTHER PUBLICATIONS

Falcone et al., "Predictive Active Steering Control for Autonomous Vehicle Systems", IEEE Transactions on Control Systems Technology, vol. 15, No. 3, May 2007, pp. 566-580.
(Continued)

*Primary Examiner* — Hunter B Lonsberry
*Assistant Examiner* — Elizabeth Yang
(74) *Attorney, Agent, or Firm* — Botos Churchill IP Law

(57) ABSTRACT

The technology relates to determining the current state of friction that a vehicle's wheels have with the road surface. This may be done via active or passive testing or other monitoring while the vehicles operates in an autonomous mode. In response to detecting the loss of traction, the vehicle's control system is able to use the resultant information to select an appropriate braking level or braking strategy. This may be done for both immediate driving operations and planning future portions of an ongoing trip. For instance, the on-board system is able to evaluate appropriate conditions and situations for active testing or passive evaluation of traction through autonomous braking and/or acceleration operations. The on-board computer system may share slippage and other road condition information with nearby vehicles and with remote assistance, so that it may be employed with broader fleet planning operations.

19 Claims, 28 Drawing Sheets

(51) Int. Cl.
  *G05D 1/02* (2020.01)
  *B60W 10/04* (2006.01)
  *B60W 10/18* (2012.01)
  *B60W 10/20* (2006.01)
  *G01S 17/86* (2020.01)
  *G01S 17/931* (2020.01)

(52) U.S. Cl.
  CPC ......... *G05D 1/0088* (2013.01); *G05D 1/0291* (2013.01); *B60W 2300/12* (2013.01); *B60W 2300/145* (2013.01); *B60W 2420/42* (2013.01); *B60W 2420/52* (2013.01); *B60W 2552/00* (2020.02); *G01S 17/86* (2020.01); *G01S 17/931* (2020.01); *G05D 2201/0213* (2013.01)

(58) Field of Classification Search
  CPC ....... B60W 2300/12; B60W 2300/145; B60W 2420/42; B60W 2420/52; G05D 1/0088; G05D 1/0291; G05D 2201/0213; G01S 17/931; G01S 17/86
  See application file for complete search history.

(56) References Cited

U.S. PATENT DOCUMENTS

| | | | |
|---|---|---|---|
| 8,126,642 | B2 | 2/2012 | Trepagnier et al. |
| 8,855,848 | B2 | 10/2014 | Zeng |
| 9,435,652 | B2 | 9/2016 | Ralston et al. |
| 9,568,915 | B1 | 2/2017 | Berntorp et al. |
| 9,576,480 | B1 | 2/2017 | Shoshan |
| 9,760,090 | B2 | 9/2017 | Shashua et al. |
| 9,947,224 | B2 | 4/2018 | Fairfield et al. |
| 2004/0099469 | A1* | 5/2004 | Koibuchi ............... B60T 8/175 180/421 |
| 2007/0276541 | A1* | 11/2007 | Sawasaki ............ G05D 1/0246 700/253 |
| 2010/0228427 | A1 | 9/2010 | Anderson et al. |
| 2013/0035836 | A1 | 2/2013 | Mehr et al. |
| 2016/0358477 | A1* | 12/2016 | Ansari ................... G08G 1/167 |
| 2017/0072923 | A1 | 3/2017 | Asano |
| 2017/0166216 | A1 | 6/2017 | Rander et al. |
| 2017/0167881 | A1 | 6/2017 | Rander et al. |
| 2017/0168495 | A1 | 6/2017 | Wood et al. |
| 2017/0168500 | A1 | 6/2017 | Bradley et al. |
| 2017/0336794 | A1 | 11/2017 | Shashua et al. |
| 2017/0371348 | A1* | 12/2017 | Mou ....................... G01S 17/86 |
| 2018/0023966 | A1 | 1/2018 | Iwai et al. |
| 2018/0129215 | A1 | 5/2018 | Hazelton et al. |
| 2018/0164827 | A1* | 6/2018 | Chu ...................... G05D 1/0217 |
| 2018/0211546 | A1 | 7/2018 | Smartt et al. |
| 2020/0003869 | A1* | 1/2020 | Yang ...................... G01S 17/42 |

OTHER PUBLICATIONS

Konolige et al., "Outdoor Mapping and Navigation using Stereo Vision", In Proc. of Intl. Symp. on Experimental Robotics (ISER-),Rio de Janeiro, Brazil, Jul. 2006, 12 pages.

Yoshida et al., "Model Predictive Vehicle Control with Side Slip Angle Restriction with Suppression of Modeling Error by Sliding Mode Control", 2014 IEEE Conference on Control Applications (CCA) Part of 2014 IEEE Multi-conference on Systems and Control, Oct. 8-10, 2014. Antibes, France, 6 pages.

Bento et al., "Inter-Vehicle Sensor Fusion for Accurate Vehicle Localization Supported by V2V and V21 Communications",2012 15th International IEEE Conference on Intelligent Transportation Systems, Anchorage, Alaska, USA, Sep. 16-19, 2012, 6 pages.

Hague et al., "Ground based sensing systems for autonomous agricultural vehicles", Computers and Electronics in Agriculture, 25 (2000) 11-28, 18 pages.

Borrelli et al., "An MPC/Hybrid System Approach to Traction Control", IEEE Transactions on Control Systems Technology, vol. 14, No. 3, May 2006, pp. 541-552.

Katrakazas et al., "Real-time motion planning methods for autonomous on-road driving: State-of-the-art and future research directions", Transportation Research Part C 60, 2015, pp. 416-442.

Bojarski et al., "End to End Learning for Self-Driving Cars", arXiv:1604.07316v1, cs.CV, Apr. 25, 2016, 9 pages.

International Search Report and Written Opinion for Application No. PCT/US2019/063269 dated Mar. 24, 2020.

* cited by examiner

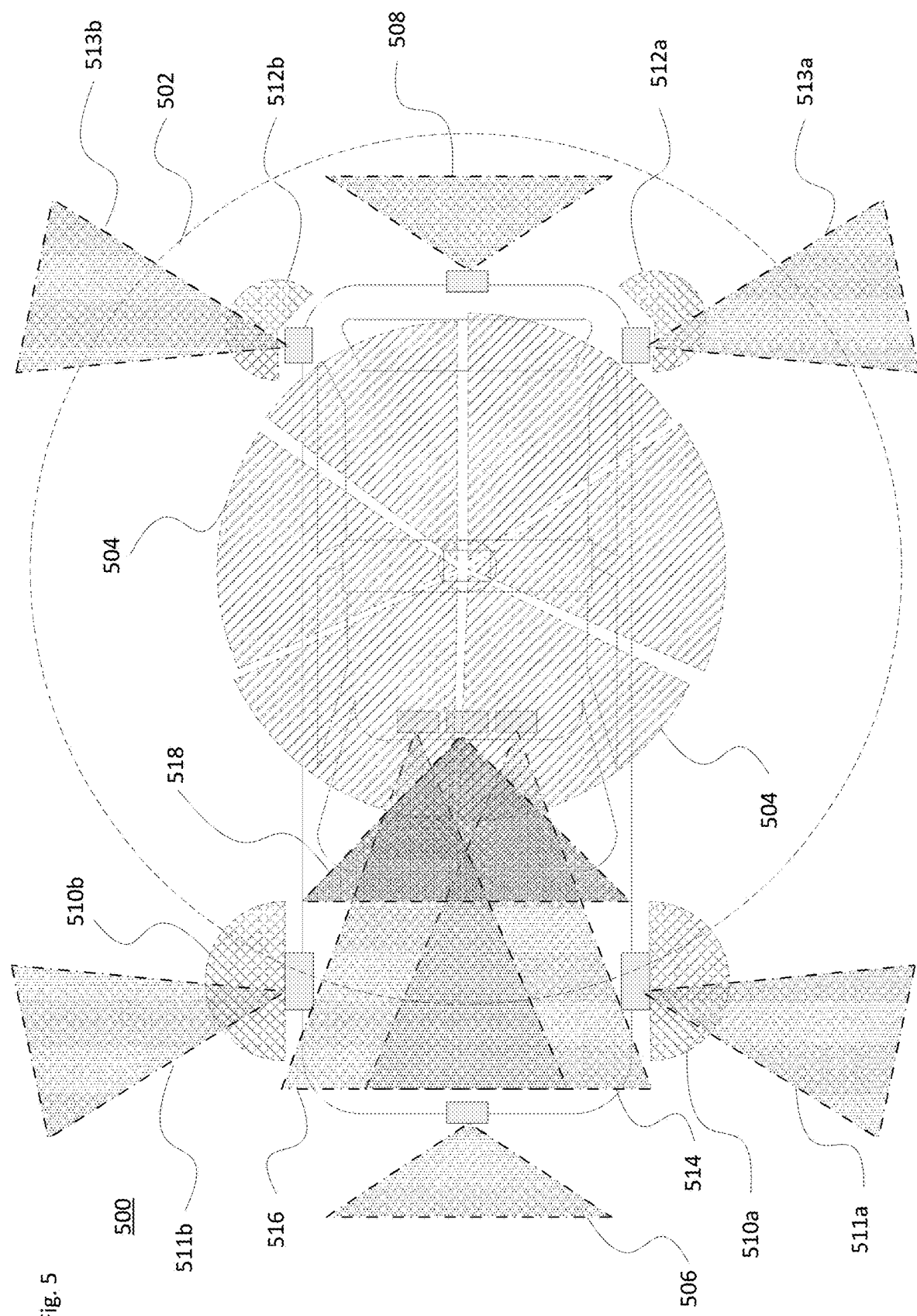

700

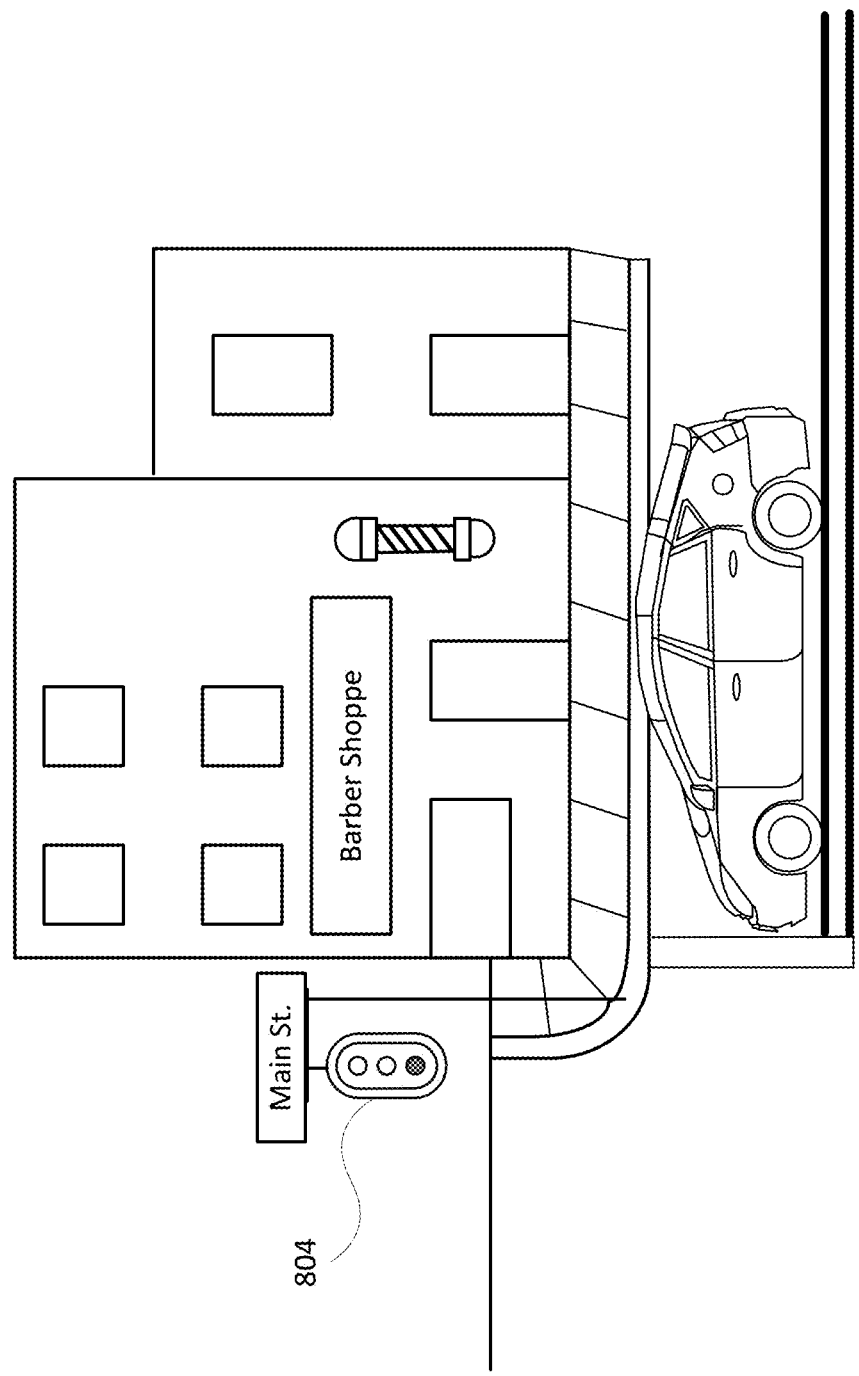

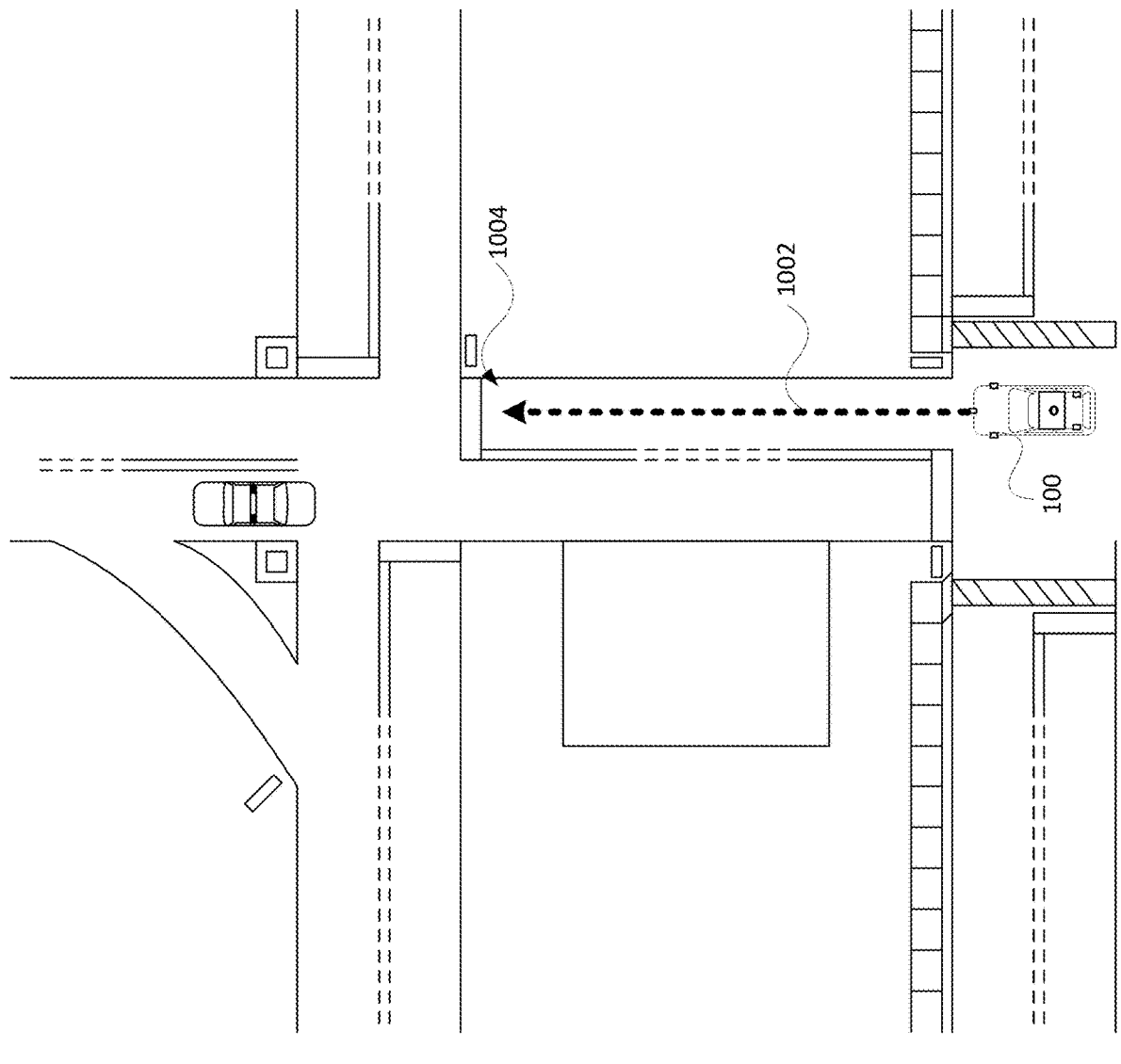

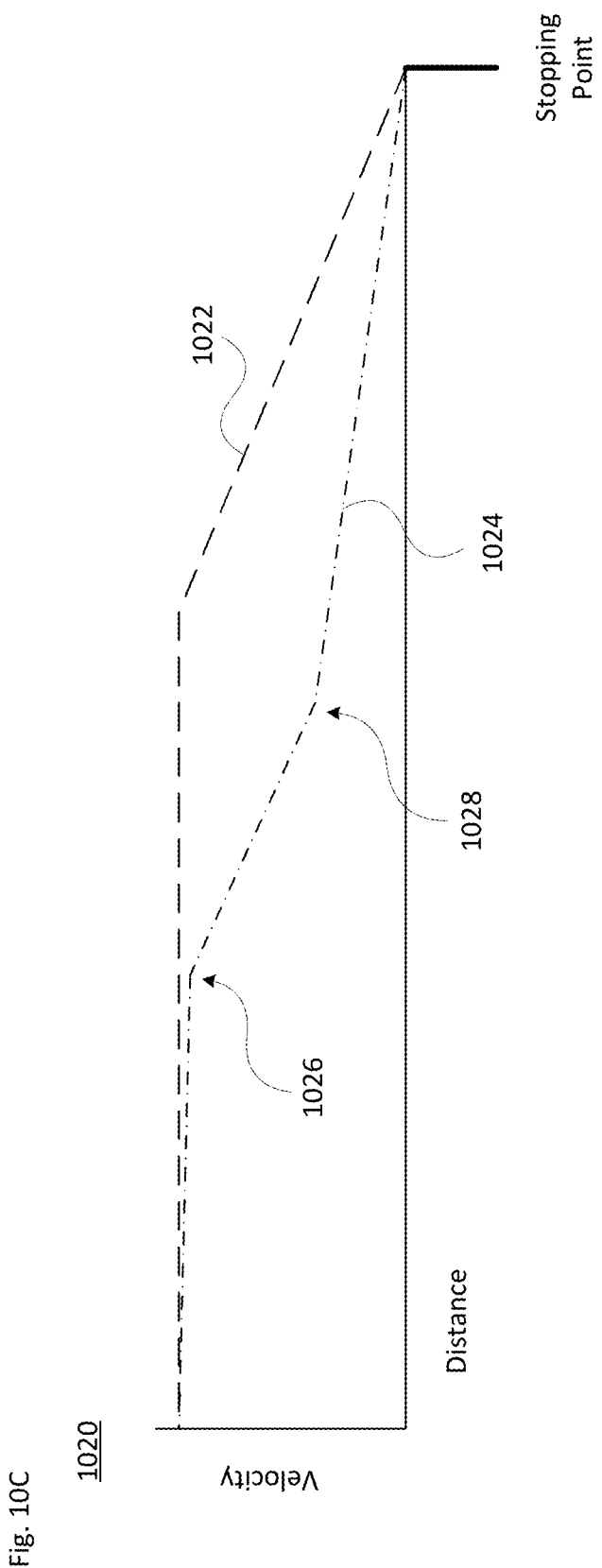

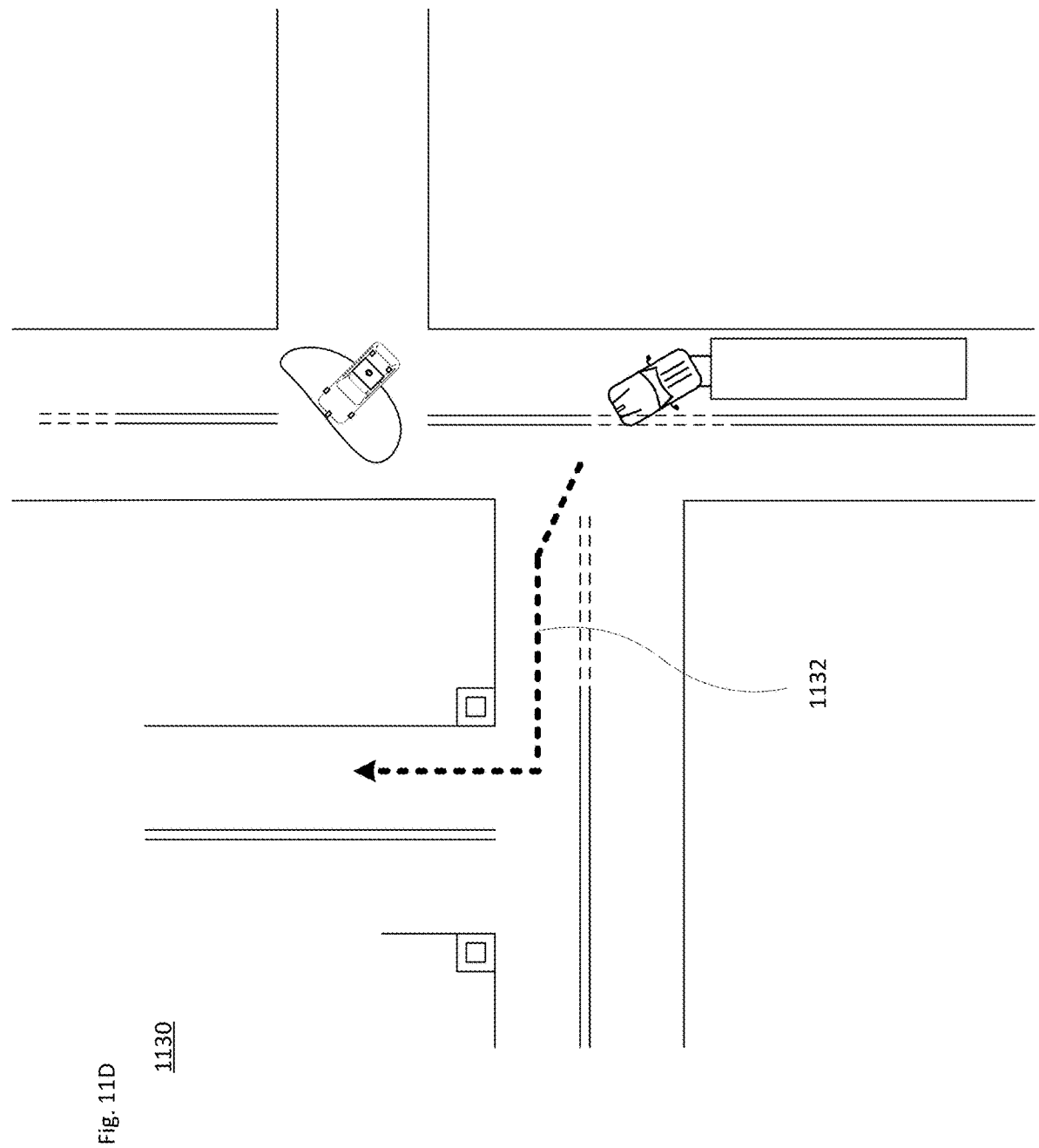

DETERMINING WHEEL SLIPPAGE ON SELF DRIVING VEHICLE

CROSS-REFERENCE TO RELATED APPLICATIONS

This application is related to U.S. application Ser. No. 16/217,235, entitled Detecting General Road Weather Conditions, filed concurrently herewith, the entire disclosure of which is incorporated by reference herein.

BACKGROUND

Autonomous vehicles, such as vehicles that do not require a human driver, can be used to aid in the transport of passengers or cargo from one location to another. Such vehicles may operate in a fully autonomous mode or a partially autonomous mode where a person may provide some driving input. In order to operate in an autonomous mode, the vehicle may employ various on-board sensors to detect features of the external environment, and use received sensor information to perform various driving operations. However, if the wheels lose traction with the road surface, this may adversely impact the driving capabilities of the vehicle. Slippage may occur as a result of various environmental factors, and the sensors arranged to detect objects in the environment by themselves may not be capable of or lack the precision needed to properly evaluate the loss of traction.

BRIEF SUMMARY

The technology relates to determining the current state of friction that a vehicle's wheels have with the road surface. The vehicle is able to monitor and actively or passively test this while operating in an autonomous mode. A loss of traction may be due to various environmental conditions, such as ice, snow or puddles on the road surface. It may also be due to grease, oil or other liquids or debris that is on the roadway. In response to a detected loss of traction, the vehicle is configured to use the resultant information when selecting appropriate braking levels and braking strategies while driving and/or planning future portions of the trip.

According to aspects of the technology, a method of operating a vehicle in an autonomous driving mode to detect a traction condition is provided. The method comprises causing, by one or more processors of the vehicle, a subsystem of the vehicle to actuate one or more components of the subsystem during operation in the autonomous driving mode; obtaining pose information of the vehicle during actuation of the one or more components of the subsystem; determining, by the one or more processors, an actual pose of the vehicle according to the obtained pose information; comparing, by the one or more processors, the actual pose with an expected pose; determining, by the one or more processors, a difference between the actual pose and the expected pose based on the comparison; determining a slippage of one or more wheels of the vehicle based on the difference; and performing at least one of a corrective driving action or a route re-planning action in response to determining the slippage of the vehicle. In one example, obtaining the pose information includes receiving sensor data from one or more sensors of the vehicle.

The corrective driving action may include at least one of performing a selected braking technique or a selected braking pattern. The corrective driving action may include adjusting at least one of a braking profile or a desired stopping point for the vehicle. And the corrective driving action may include reducing a maximum driving speed along a selected portion of roadway. The corrective driving action may be performed based on the actual pose.

The route re-planning action may include at least one of maneuvering to a different lane on a roadway or selecting an alternate route. Performing the route re-planning action may include predicting a likelihood of slippage at an upcoming section of a current route.

In one scenario, the given one of the one or more components may be a braking component and the subsystem may be a deceleration system. Or the component may be an acceleration component and the subsystem may be an acceleration system. Or the component may be a steering component and the subsystem may be a steering system.

Determining the slippage of one or more wheels of the vehicle based on the difference may include determining that the difference exceeds a threshold value. The difference may indicate a variance in one or more of a relative distance to another object, in an orientation of the vehicle, or a direction of travel.

Causing the subsystem of the vehicle to actuate one or more components of the subsystem may include performing at least one of a braking operation or an acceleration operation during operation in the autonomous driving mode.

The method may further comprise transmitting information about the slippage to at least one of another vehicle or a remote fleet management system.

According to other aspects of the technology, a vehicle configured to operate in an autonomous driving mode is provided. The vehicle comprises a driving system, a perception system, a positioning system and a control system. The driving system includes a steering subsystem, an acceleration subsystem and a deceleration subsystem to control driving of the vehicle in the autonomous driving mode. The perception system includes one or more sensors configured to detect objects in an environment external to the vehicle. The positioning system is configured to determine a current position of the vehicle. The control system includes one or more processors. The control system is operatively coupled to the driving system, the perception system and the positioning system. The control system is configured to cause a subsystem of the vehicle to actuate one or more components of the subsystem during operation in the autonomous driving mode. It is also configured to obtain, from at least one of the positioning system and the perception system, pose information of the vehicle during actuation of the one or more components of the subsystem. The control system is further configured to determine an actual pose of the vehicle according to the obtained pose information, compare the actual pose with an expected pose, determine a difference between the actual pose and the expected pose based on the comparison, determine a slippage of one or more wheels of the vehicle based on the difference, and either cause the driving system to take a corrective driving action or perform a route re-planning action in response to determining the slippage of the vehicle.

In one scenario, the corrective driving action may include the deceleration subsystem performing at least one of a selected braking technique or a selected braking pattern. Or the corrective driving action may include adjusting at least one of a braking profile or a desired stopping point for the vehicle. Or the corrective driving action may include reducing a maximum driving speed along a selected portion of roadway.

The route re-planning action may include at least one of maneuvering to a different lane on a roadway or selecting an alternate route, or predicting a likelihood of slippage at an upcoming section of a current route.

A given one of the one or more components may be a braking component and the subsystem may be the deceleration subsystem. Or the given component may be an acceleration component and the subsystem may be the acceleration subsystem. Or the given component may be a steering component and the subsystem may be the steering subsystem.

The vehicle may further comprise a communication system configured to transmit information about the slippage to at least one of another vehicle or a remote fleet management system.

BRIEF DESCRIPTION OF THE DRAWINGS

FIG. 5 illustrates example sensor fields of view for a passenger-type vehicle in accordance with aspects of the disclosure.

FIGS. 8A-D illustrate an example acceleration scenario in accordance with aspects of the technology.

FIGS. 10A-B illustrate an examples of adjusting a braking profile for a desired stopping point in accordance with aspects of the technology.

FIG. 10C illustrates an example of contrasting speed profiles in accordance with aspects of the technology.

FIGS. 11C-D illustrate an example of route re-planning in accordance with aspects of the technology.

DETAILED DESCRIPTION

Aspects of the technology include evaluating appropriate conditions and situations for active testing or passive evaluation of traction through braking and/or acceleration operations. A typical traction control system may be able to detect slippage during a braking operation and rapidly actuate the brakes at that point in time. However, such activity for a current condition is quite limited and has no impact on future driving. In contrast, other aspects of the technology are capable of utilizing the acquired traction information obtained from selected conditions or situations and feed that information into the vehicle's planning system for use in upcoming autonomous mode operations and to address ongoing driving situations.

Example Vehicle Systems

Figure 1A:
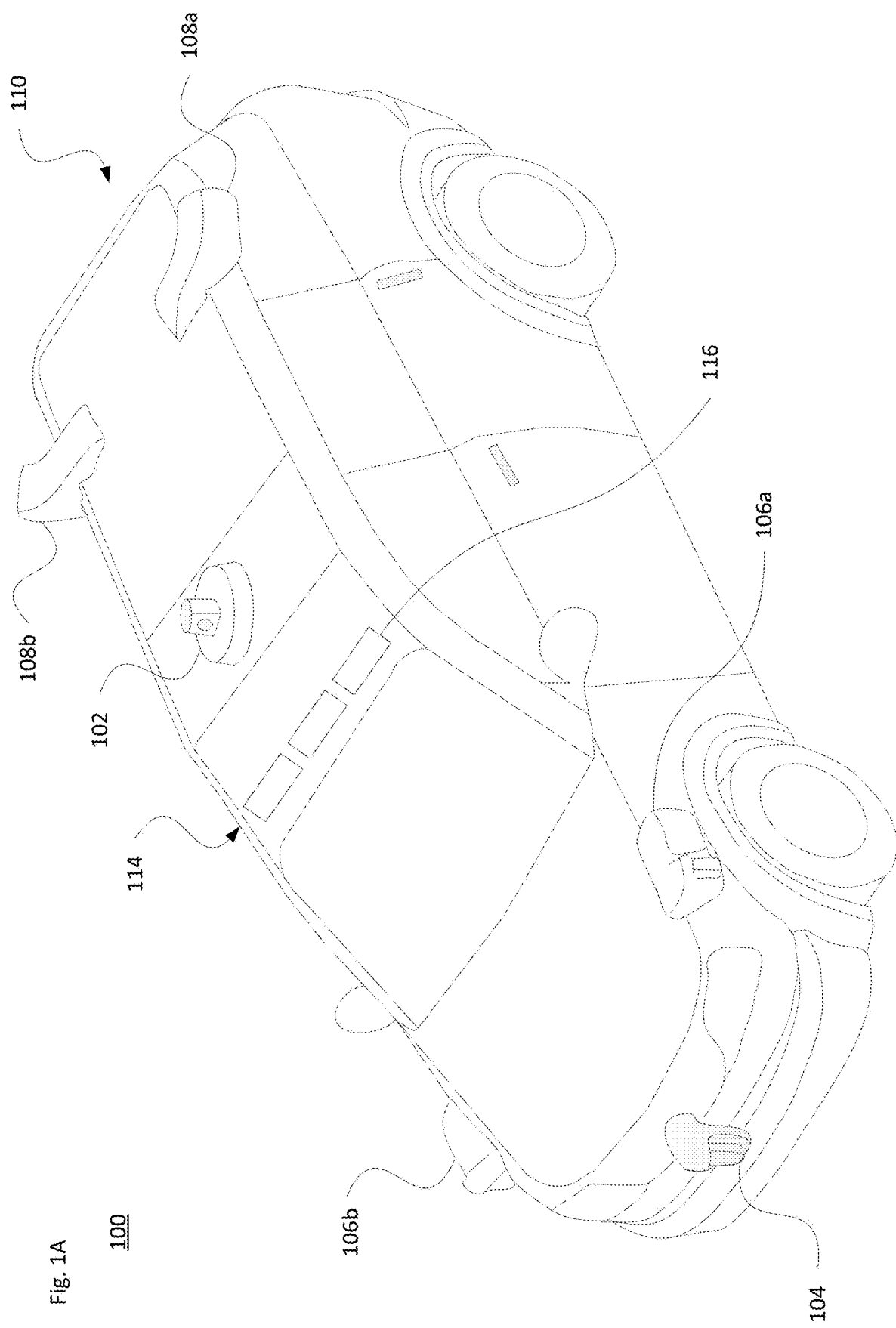
FIGS. 1A-B illustrate an example passenger-type vehicle configured for use with aspects of the technology.
Figure 1B:
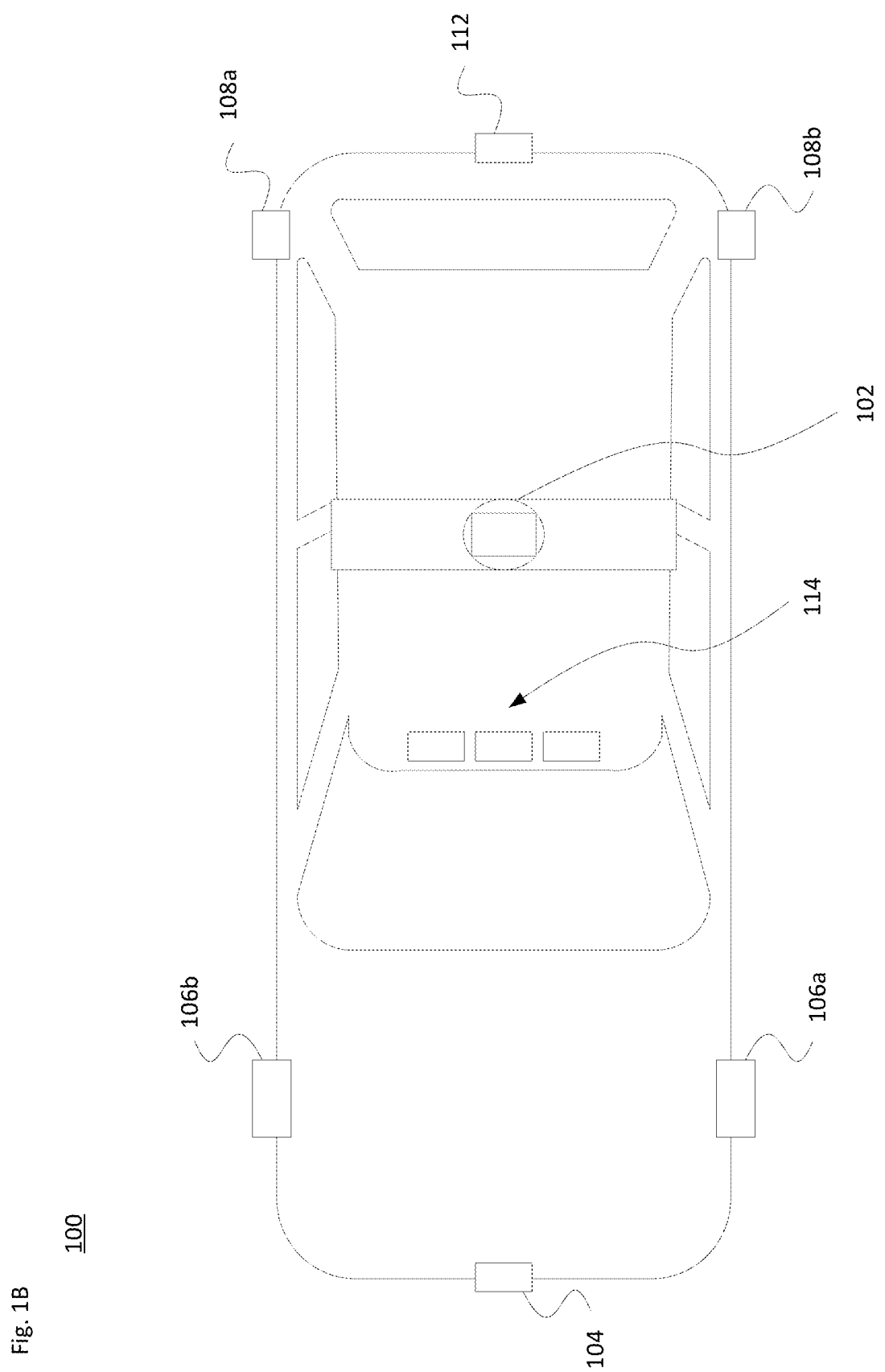

FIG. 1A illustrates a perspective view of an example passenger vehicle 100, such as a minivan, sport utility vehicle (SUV) or other vehicle. FIG. 1B illustrates a top-down view of the passenger vehicle 100. The passenger vehicle 100 may include various sensors for obtaining information about the vehicle's external environment. For instance, a roof-top housing 102 may include a Lidar sensor as well as various cameras, radar units, infrared and/or acoustical sensors. Housing 104, located at the front end of vehicle 100, and housings 106a, 106b on the driver's and passenger's sides of the vehicle may each incorporate Lidar, radar, camera and/or other sensors. For example, housing 106a may be located in front of the driver's side door along a quarter panel of the vehicle. As shown, the passenger vehicle 100 also includes housings 108a, 108b for radar units, Lidar and/or cameras also located towards the rear roof portion of the vehicle. Additional Lidar, radar units and/or cameras (not shown) may be located at other places along the vehicle 100. For instance, arrow 110 indicates that a sensor unit (112 in FIG. 1B) may be positioned along the rear of the vehicle 100, such as on or adjacent to the bumper. And arrow 114 indicates a series of sensor units 116 arranged along a forward-facing direction of the vehicle. In some examples, the passenger vehicle 100 also may include various sensors for obtaining information about the vehicle's interior spaces (not shown).

Figure 1C:
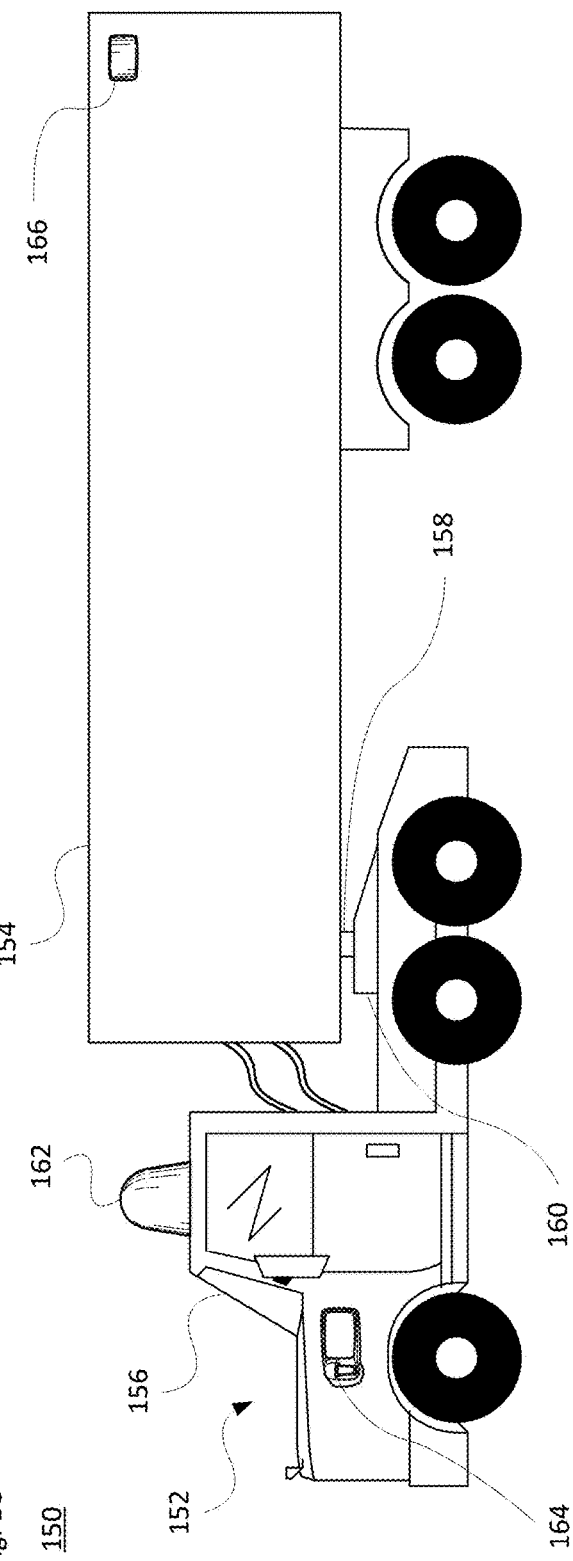
FIGS. 1C-D illustrate an example cargo-type vehicle configured for use with aspects of the technology.
Figure 1D:
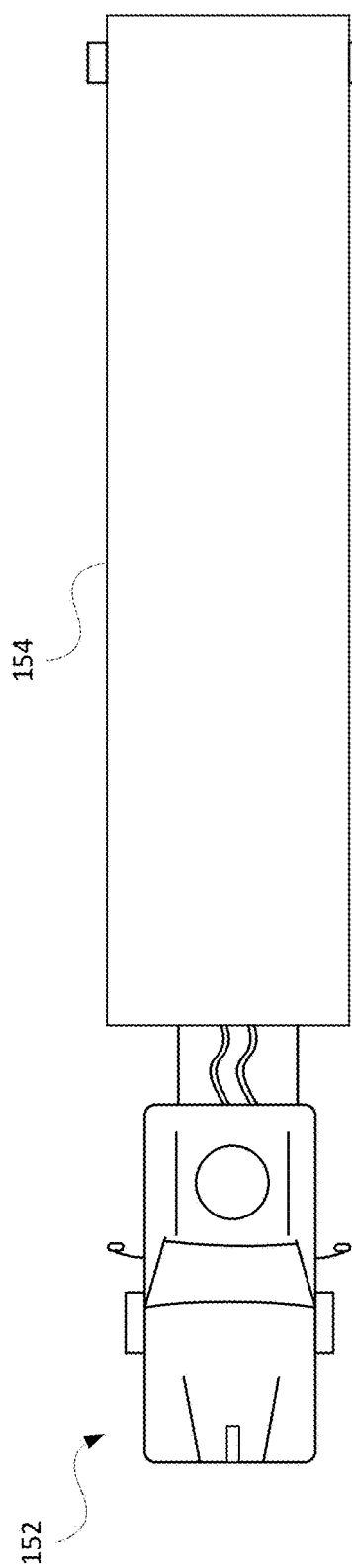

FIGS. 1C-D illustrate an example cargo vehicle 150, such as a tractor-trailer truck. The truck may include, e.g., a single, double or triple trailer, or may be another medium or heavy duty truck such as in commercial weight classes 4 through 8. As shown, the truck includes a tractor unit 152 and a single cargo unit or trailer 154. The trailer 154 may be fully enclosed, open such as a flat bed, or partially open depending on the type of cargo to be transported. In this example, the tractor unit 152 includes the engine and steering systems (not shown) and a cab 156 for a driver and any passengers. In a fully autonomous arrangement, the cab 156 may not be equipped with seats or manual driving components, since no person may be necessary.

The trailer 154 includes a hitching point, known as a kingpin, 158. The kingpin 158 is typically formed as a solid steel shaft, which is configured to pivotally attach to the tractor unit 152. In particular, the kingpin 158 attaches to a trailer coupling 160, known as a fifth-wheel, that is mounted rearward of the cab. For a double or triple tractor-trailer, the second and/or third trailers may have simple hitch connections to the leading trailer. Or, alternatively, each trailer may have its own kingpin. In this case, at least the first and second trailers could include a fifth-wheel type structure arranged to couple to the next trailer.

As shown, the tractor may have one or more sensor units 162, 164 disposed therealong. For instance, one or more sensor units 162 may be disposed on a roof or top portion of the cab 156, and one or more side sensor units 164 may be disposed on left and/or right sides of the cab 156. Sensor units may also be located along other regions of the cab 106, such as along the front bumper or hood area, in the rear of the cab, adjacent to the fifth-wheel, underneath the chassis, etc. The trailer 154 may also have one or more sensor units 166 disposed therealong, for instance along a side panel, front, rear, roof and/or undercarriage of the trailer 154.

By way of example, each sensor unit may include one or more sensors, such as Lidar, radar, camera (e.g., optical or infrared), acoustical (e.g., microphone or sonar-type sensor), inertial (e.g., accelerometer, gyroscope, etc.) or other sensors (e.g., positioning sensors such as GPS sensors). While certain aspects of the disclosure may be particularly useful in connection with specific types of vehicles, the vehicle may be any type of vehicle including, but not limited to, cars, trucks, motorcycles, buses, recreational vehicles, etc.

There are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as autonomous driving modes. Thus, reference to an autonomous driving mode includes both partial and full autonomy.

Figure 2:
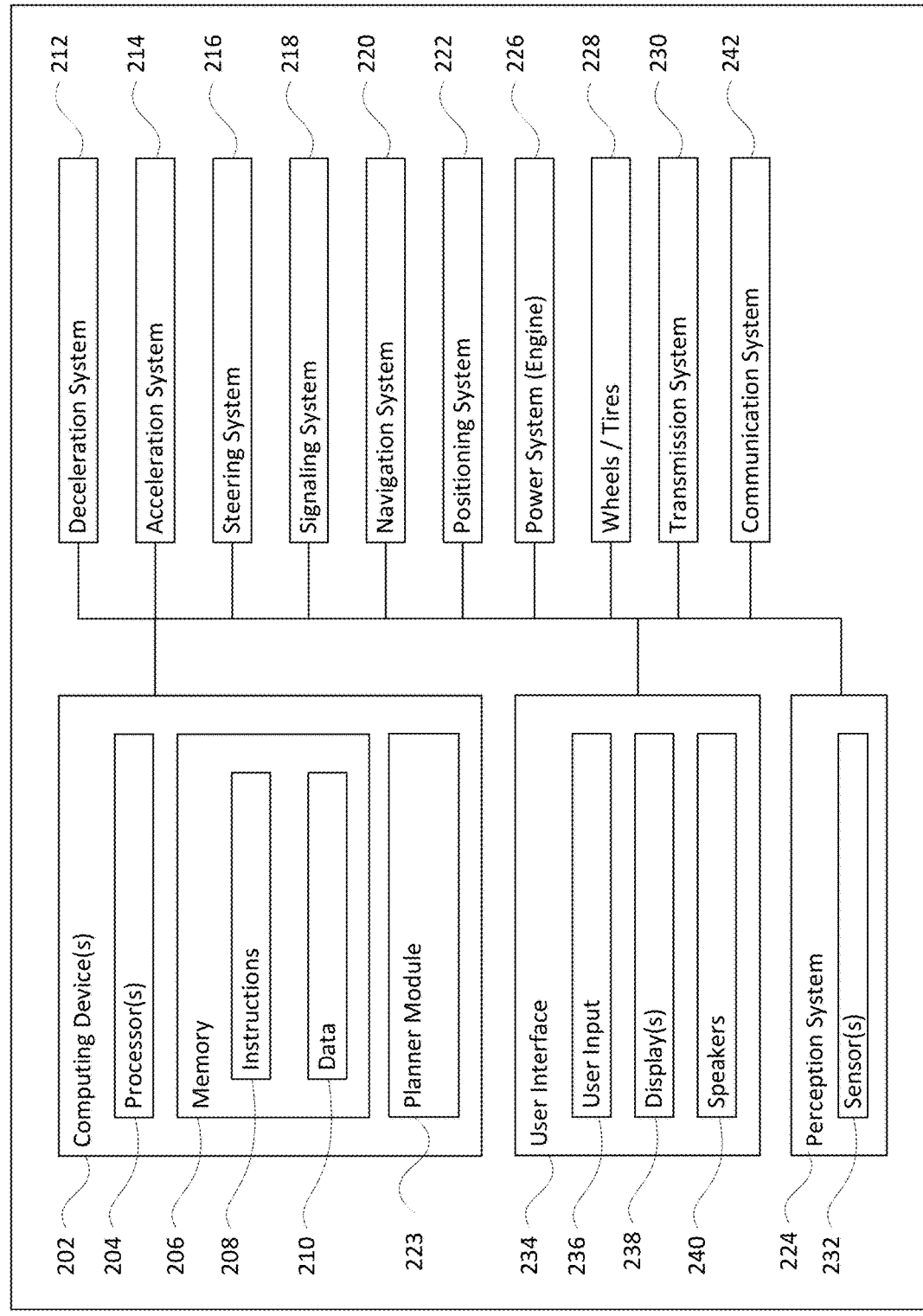
FIG. 2 is a block diagram of systems of an example passenger-type vehicle in accordance with aspects of the technology.

FIG. 2 illustrates a block diagram 200 with various components and systems of an exemplary vehicle, such as passenger vehicle 100, to operate in an autonomous driving mode. As shown, the block diagram 200 includes one or more computing devices 202, such as computing devices containing one or more processors 204, memory 206 and other components typically present in general purpose computing devices. The memory 206 stores information accessible by the one or more processors 204, including instructions 208 and data 210 that may be executed or otherwise used by the processor(s) 204. The computing system may control overall operation of the vehicle when operating in an autonomous driving mode.

The memory 206 stores information accessible by the processors 204, including instructions 208 and data 210 that may be executed or otherwise used by the processors 204. The memory 206 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. In one example, some or all of the memory 206 may be an event data recorder or other secure data storage system configured to store vehicle diagnostics and/or detected sensor data, which may be on board the vehicle or remote, depending on the implementation.

The processors 204 may be any conventional processors, such as commercially available CPUs. Alternatively, each processor may be a dedicated device such as an ASIC or other hardware-based processor. Although FIG. 2 functionally illustrates the processors, memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system may capable of communicating with various components of the vehicle. For example, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle, e.g., including the vehicle's pose). The autonomous driving computing system may employ a planner module 223, in accordance with the navigation system 220, the positioning system 222 and/or other components of the system, e.g., for determining a route from a starting point to a destination or for making modifications to various driving aspects in view of current or expected traction conditions.

The computing devices 202 are also operatively coupled to a perception system 224 (for detecting objects in the vehicle's environment), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle, e.g., via the planner module 223, by controlling various components. By way of example, computing devices 202 may navigate the vehicle to a destination location completely autonomously using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 by steering system 216), and signal such changes (e.g., by lighting turn signals of signaling system 218). Thus, the acceleration system 214 and deceleration system 212 may be a part of a drivetrain or other type of transmission system 230 that includes various components between an engine of the vehicle and the wheels of the vehicle. Again, by controlling these systems, computing devices 202 may also control the transmission system 230 of the vehicle in order to maneuver the vehicle autonomously.

Navigation system 220 may be used by computing devices 202 in order to determine and follow a route to a location. In this regard, the navigation system 220 and/or memory 206 may store map information, e.g., highly detailed maps that computing devices 202 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

The perception system 224 includes sensors 232 for detecting objects external to the vehicle. The detected objects may be other vehicles, obstacles in the roadway, traffic signals, signs, trees, etc. By way of example only, the perception system 224 may include one or more light detection and ranging (Lidar) sensors, radar units, cameras (e.g., optical imaging devices, with or without a neutral-density filter (ND) filter), positioning sensors (e.g., gyroscopes, accelerometers and/or other inertial components), infrared sensors, acoustical sensors (e.g., microphones or sonar transducers), and/or any other detection devices that record data which may be processed by computing devices 202. Such sensors of the perception system 224 may detect objects outside of the vehicle and their characteristics such as location, orientation, size, shape, type (for instance, vehicle, pedestrian, bicyclist, etc.), heading, speed of movement relative to the vehicle, etc. The perception system 224 may also include other sensors within the vehicle to detect objects and conditions within the vehicle, such as in the passenger compartment. For instance, such sensors may detect, e.g., one or more persons, pets, packages, etc., as well as conditions within and/or outside the vehicle such as temperature, humidity, etc. Still further sensors 232 of the perception system 224 may measure the rate of rotation of the wheels 228, an amount or a type of braking by the deceleration system 312, and other factors associated with the equipment of the vehicle itself.

The raw data from the sensors and the aforementioned characteristics can be processed by the perception system 224 and/or sent for further processing to the computing devices 202 periodically or continuously as the data is generated by the perception system 224. Computing devices 202 may use the positioning system 222 to determine the vehicle's location and perception system 224 to detect and respond to objects when needed to reach the location safely, e.g., via adjustments made by planner module 223. In addition, the computing devices 202 may perform calibration of individual sensors, all sensors in a particular sensor assembly, or between sensors in different sensor assemblies or other physical housings.

As illustrated in FIGS. 1A-B, certain sensors of the perception system 224 may be incorporated into one or more sensor assemblies or housings. In one example, these may be integrated into the side-view mirrors on the vehicle. In another example, other sensors may be part of the roof-top housing 102, or other sensor housings or units 106a,b, 108a,b, 112 and/or 116. The computing devices 202 may communicate with the sensor assemblies located on or otherwise distributed along the vehicle. Each assembly may have one or more types of sensors such as those described above.

Returning to FIG. 2, computing devices 202 may include all of the components normally used in connection with a computing device such as the processor and memory described above as well as a user interface subsystem 234. The user interface subsystem 234 may include one or more user inputs 236 (e.g., a mouse, keyboard, touch screen and/or microphone) and one or more display devices 238 (e.g., a monitor having a screen or any other electrical device that is operable to display information). In this regard, an internal electronic display may be located within a cabin of the vehicle (not shown) and may be used by computing devices 202 to provide information to passengers within the vehicle. Other output devices, such as speaker(s) 240 may also be located within the passenger vehicle.

The passenger vehicle also includes a communication system 242. For instance, the communication system 242 may also include one or more wireless configurations to facilitate communication with other computing devices, such as passenger computing devices within the vehicle, computing devices external to the vehicle such as in another nearby vehicle on the roadway, and/or a remote server system. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Figure 3A:
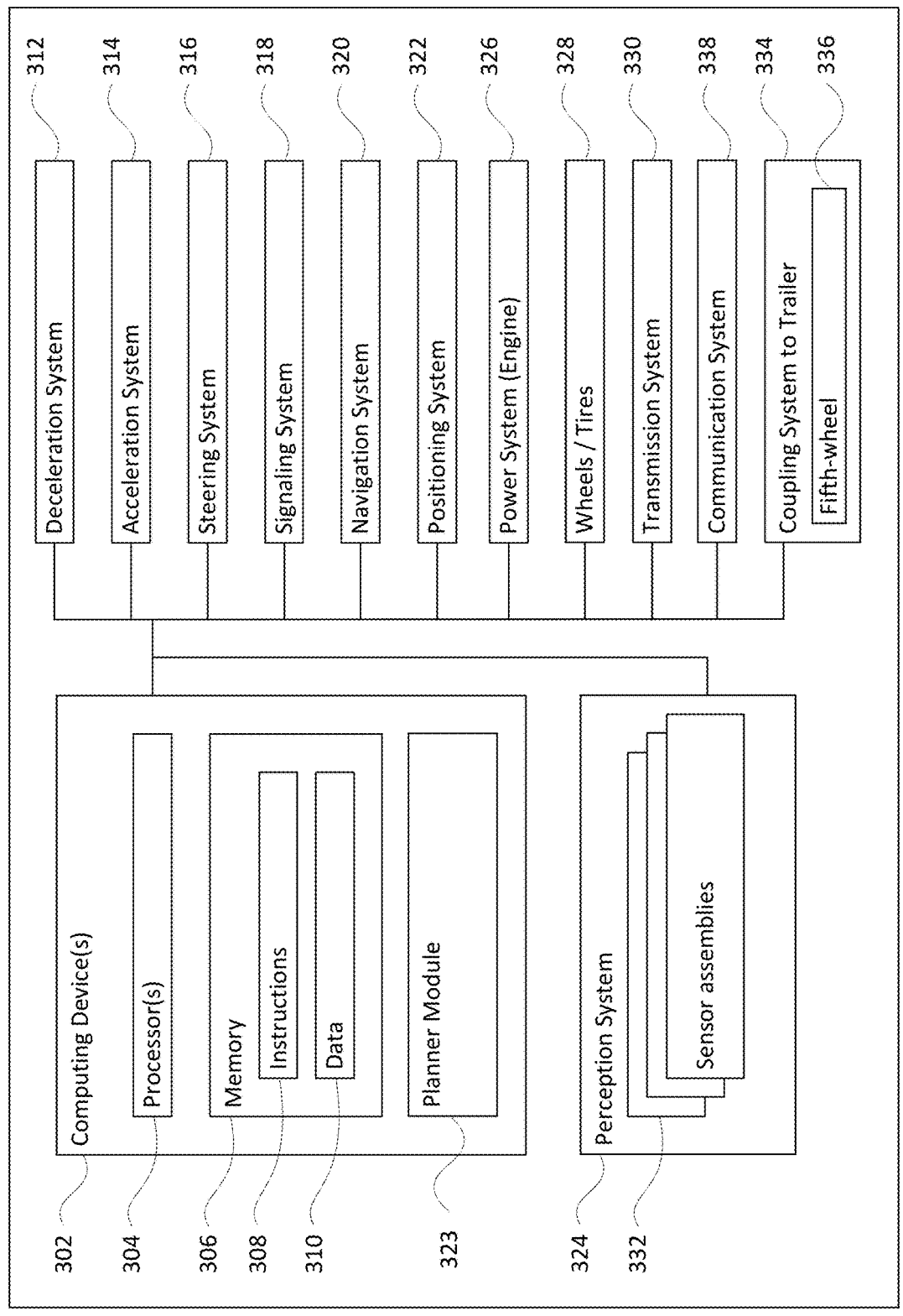
FIGS. 3A-B are block diagrams of systems of an example cargo-type vehicle in accordance with aspects of the technology.

FIG. 3A illustrates a block diagram 300 with various components and systems of a vehicle, e.g., vehicle 150 of FIG. 1C. By way of example, the vehicle may be a truck, farm equipment or construction equipment, configured to operate in one or more autonomous modes of operation. As shown in the block diagram 300, the vehicle includes a control system of one or more computing devices, such as computing devices 302 containing one or more processors 304, memory 306 and other components similar or equivalent to components 202, 204 and 206 discussed above with regard to FIG. 2. The control system may constitute an electronic control unit (ECU) of a tractor unit of a cargo vehicle. As with instructions 208, the instructions 308 may be any set of instructions to be executed directly (such as machine code) or indirectly (such as scripts) by the processor. Similarly, the data 310 may be retrieved, stored or modified by one or more processors 304 in accordance with the instructions 308.

In one example, the computing devices 302 may form an autonomous driving computing system incorporated into vehicle 150. Similar to the arrangement discussed above regarding FIG. 2, the autonomous driving computing system of block diagram 300 may capable of communicating with various components of the vehicle in order to perform route planning and driving operations. For example, the computing devices 302 may be in communication with various systems of the vehicle, such as a driving system including a deceleration system 312, acceleration system 314, steering system 316, signaling system 318, navigation system 320 and a positioning system 322, each of which may function as discussed above regarding FIG. 2.

The computing devices 302 are also operatively coupled to a perception system 324, a power system 326 and a transmission system 330. Some or all of the wheels/tires 228 are coupled to the transmission system 230, and the computing devices 202 may be able to receive information about tire pressure, balance, rotation rate and other factors that may impact driving in an autonomous mode. As with computing devices 202, the computing devices 302 may control the direction and speed of the vehicle by controlling various components. By way of example, computing devices 302 may navigate the vehicle to a destination location completely autonomously using data from the map information and navigation system 320. Computing devices 302 may employ a planner module 323, in conjunction with the positioning system 322, the perception system 324 and other subsystems to detect and respond to objects when needed to reach the location safely, similar to the manner described above for FIG. 2.

Similar to perception system 224, the perception system 324 also includes one or more sensors or other components such as those described above for detecting objects external to the vehicle, objects or conditions internal to the vehicle, and/or operation of certain vehicle equipment such as the wheels and deceleration system 312. For instance, as indicated in FIG. 3A the perception system 324 includes one or more sensor assemblies 332. Each sensor assembly 232 includes one or more sensors. In one example, the sensor assemblies 332 may be arranged as sensor towers integrated into the side-view mirrors on the truck, farm equipment, construction equipment or the like. Sensor assemblies 332 may also be positioned at different locations on the tractor unit 152 or on the trailer 154, as noted above with regard to FIGS. 1C-D. The computing devices 302 may communicate with the sensor assemblies located on both the tractor unit 152 and the trailer 154. Each assembly may have one or more types of sensors such as those described above.

Also shown in FIG. 3A is a coupling system 334 for connectivity between the tractor unit and the trailer. The coupling system 334 may include one or more power and/or pneumatic connections (not shown), and a fifth-wheel 336 at the tractor unit for connection to the kingpin at the trailer. A communication system 338, equivalent to communication system 242, is also shown as part of vehicle system 300.

Figure 3B:
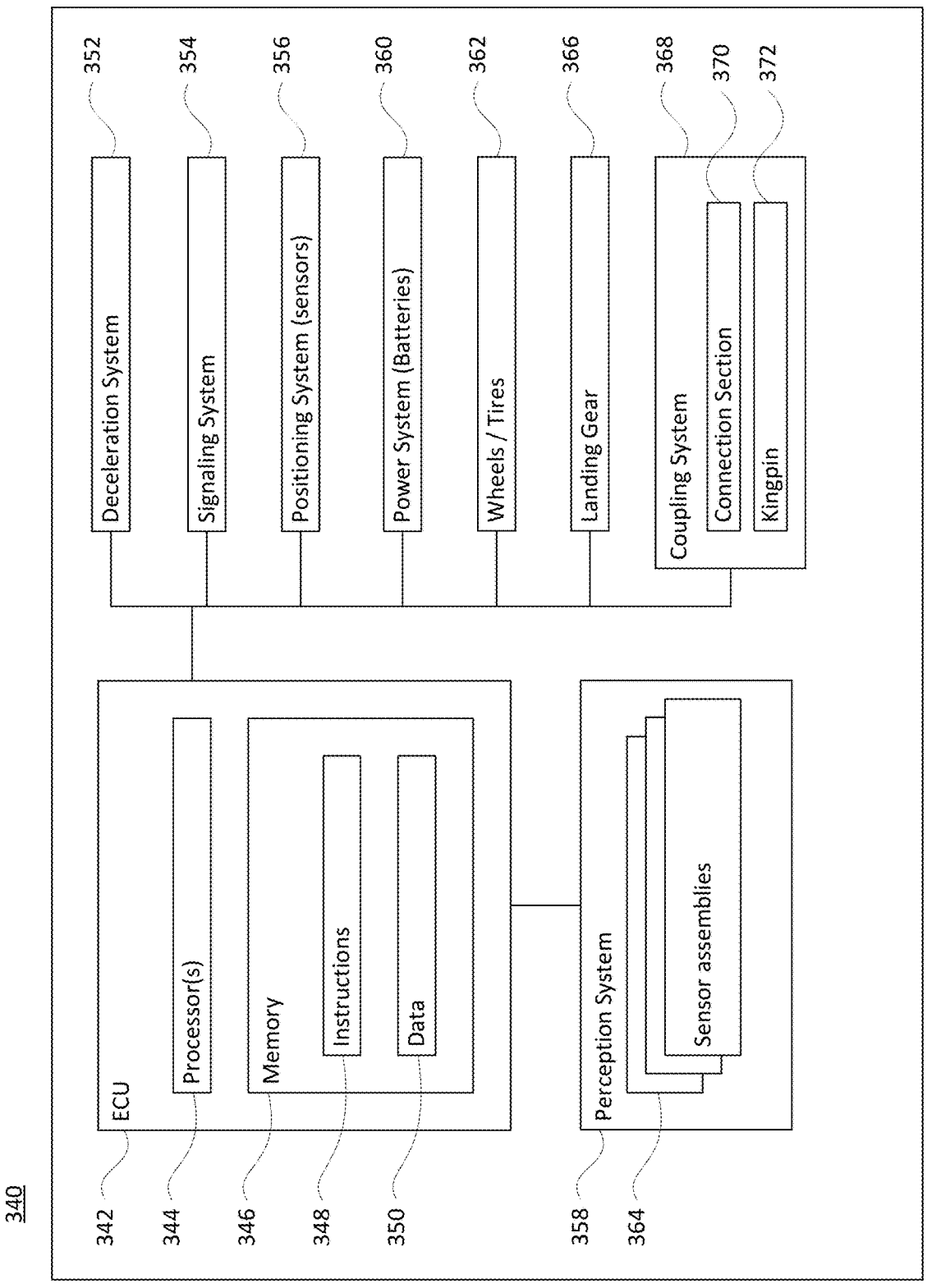

FIG. 3B illustrates an example block diagram 340 of systems of the trailer, such as trailer 154 of FIGS. 1C-D. As shown, the system includes an ECU 342 of one or more computing devices, such as computing devices containing one or more processors 344, memory 346 and other components typically present in general purpose computing devices. The memory 346 stores information accessible by the one or more processors 344, including instructions 348 and data 350 that may be executed or otherwise used by the processor(s) 344. The descriptions of the processors, memory, instructions and data from FIGS. 2 and 3A apply to these elements of FIG. 3B.

The ECU 342 is configured to receive information and control signals from the trailer unit. The on-board processors 344 of the ECU 342 may communicate with various systems of the trailer, including a deceleration system 352, signaling system 254, and a positioning system 356. The ECU 342 may also be operatively coupled to a perception system 358 with one or more sensors for detecting objects in the trailer's environment and a power system 260 (for example, a battery power supply) to provide power to local components. Some or all of the wheels/tires 362 of the trailer may be coupled to the deceleration system 352, and the processors 344 may be able to receive information about tire pressure, balance, wheel speed and other factors that may impact driving in an autonomous mode, and to relay that information to the processing system of the tractor unit. The deceleration system 352, signaling system 354, positioning system 356, perception system 358, power system 360 and wheels/tires 362 may operate in a manner such as described above with regard to FIGS. 2 and 3A.

The trailer also includes a set of landing gear 366, as well as a coupling system 368. The landing gear provide a support structure for the trailer when decoupled from the tractor unit. The coupling system 368, which may be a part of coupling system 334, provides connectivity between the trailer and the tractor unit. Thus, the coupling system 368 may include a connection section 370 (e.g., for power and/or pneumatic links). The coupling system also includes a kingpin 372 configured for connectivity with the fifth-wheel of the tractor unit.

Example Implementations

In view of the structures and configurations described above and illustrated in the figures, various aspects will now be described in accordance with aspects of the technology.

Figure 4:
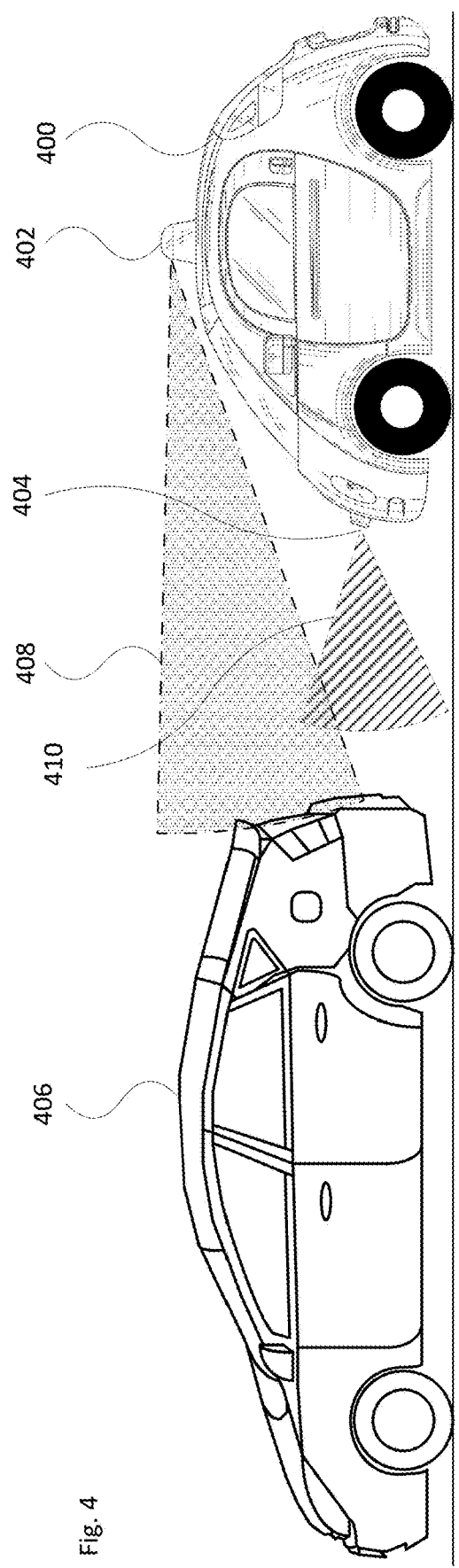
FIG. 4 illustrates an example of detecting an object in a sensor field of view in accordance with aspects of the technology.

FIG. 4 illustrates a scenario in which vehicle 400 uses sensors 402 and 404 to detect the presence of another vehicle 406. As shown, sensors 402 and 404 have respective fields of view (FOV) 408 and 410 to detect objects in front of vehicle 400. In this example, the sensors 402 and 404 may be, e.g., Lidar, radar, image and/or acoustical sensors.

Various sensors may be located at different places around the vehicle (see FIGS. 1A-D) to gather data from different parts of the external environment. Certain sensors may have different fields of view depending on their placement around the vehicle and the type of information they are designed to gather. For instance, different Lidar sensors may be used for near (short range) detection of objects adjacent to the vehicle (e.g., less than 2-10 meters), while others may be used for far (long range) detection of objects a hundred meters (or more or less) in front of the vehicle. Mid-range Lidars may also be employed. Multiple radar units may be positioned toward the front or rear of the vehicle for long-range object detection. And cameras may be arranged to provide good visibility around the vehicle. Depending on the configuration, certain types of sensors may include multiple individual sensors with overlapping fields of view. Alternatively, other sensors may provide redundant 360° fields of view.

FIG. 5 provides one example 500 of sensor fields of view relating to the sensors illustrated in FIG. 1B. Here, should the roof-top housing 102 include a Lidar sensor as well as various cameras, radar units, infrared and/or acoustical sensors, each of those sensors may have a different field of view. Thus, as shown, the Lidar sensor may provide a 360° FOV 502, while cameras arranged within the housing 102 may have individual FOVs 504. A sensor within housing 104 at the front end of the vehicle has a forward facing FOV 506, while a sensor within housing 112 at the rear end has a rearward facing FOV 508. The housings 106a, 106b on the driver's and passenger's sides of the vehicle may each incorporate Lidar, radar, camera and/or other sensors. For instance, Lidars within housings 106a and 106b may have a respective FOV 510a or 510b, while radar units or other sensors within housings 106a and 106b may have a respective FOV 511a or 511b. Similarly, sensors within housings 108a, 108b located towards the rear roof portion of the vehicle each have a respective FOV. For instance, Lidars within housings 108a and 108b may have a respective FOV 512a or 512b, while radar units or other sensors within housings 108a and 108b may have a respective FOV 513a or 513b. And the series of sensor units 116 arranged along a forward-facing direction of the vehicle may have respective FOVs 514, 516 and 518. Each of these fields of view is merely exemplary and not to scale in terms of coverage range.

Figure 6A:
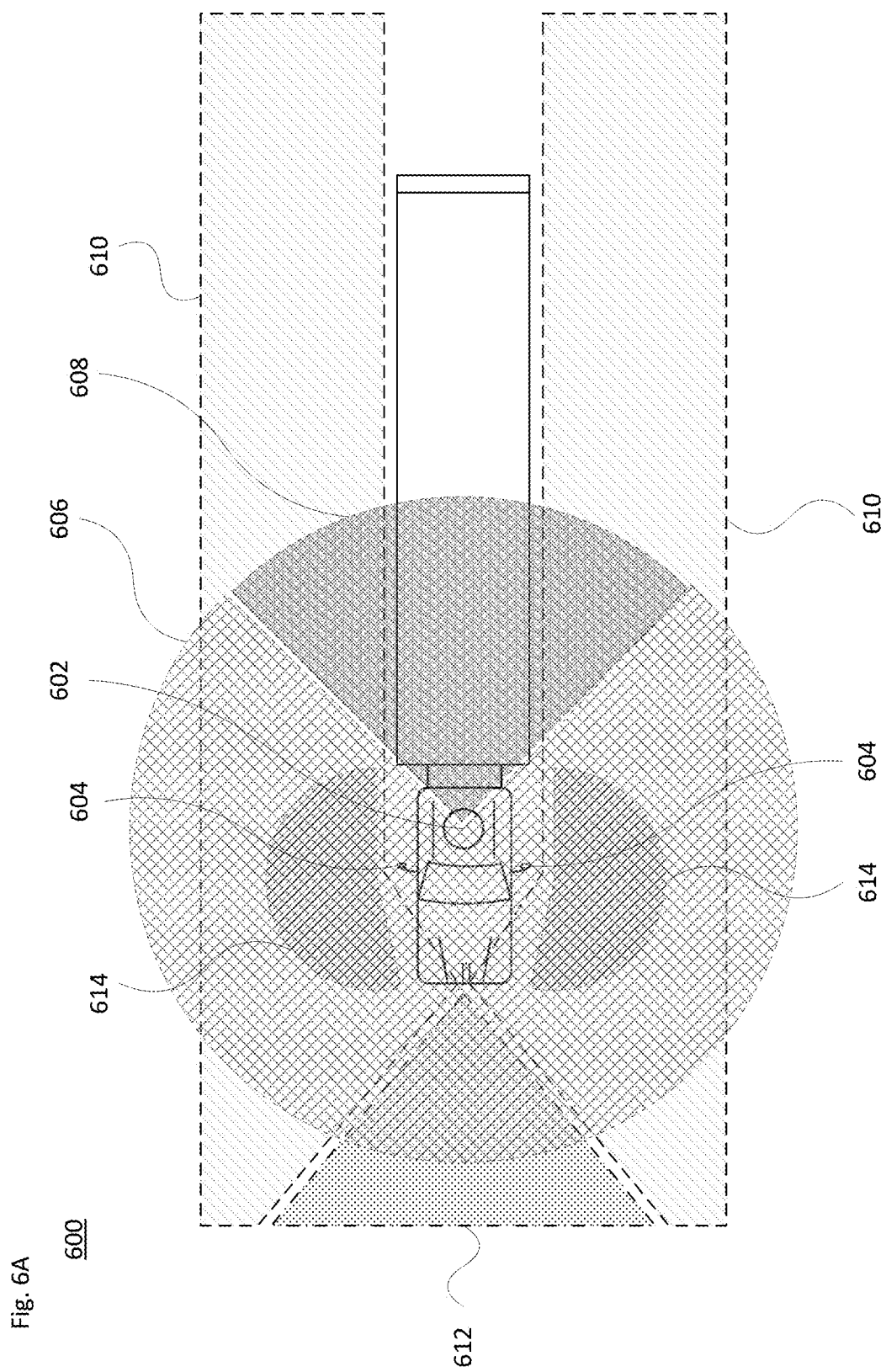
FIGS. 6A-B illustrate example sensor fields of view for a cargo-type vehicle in accordance with aspects of the disclosure.
Figure 6B:
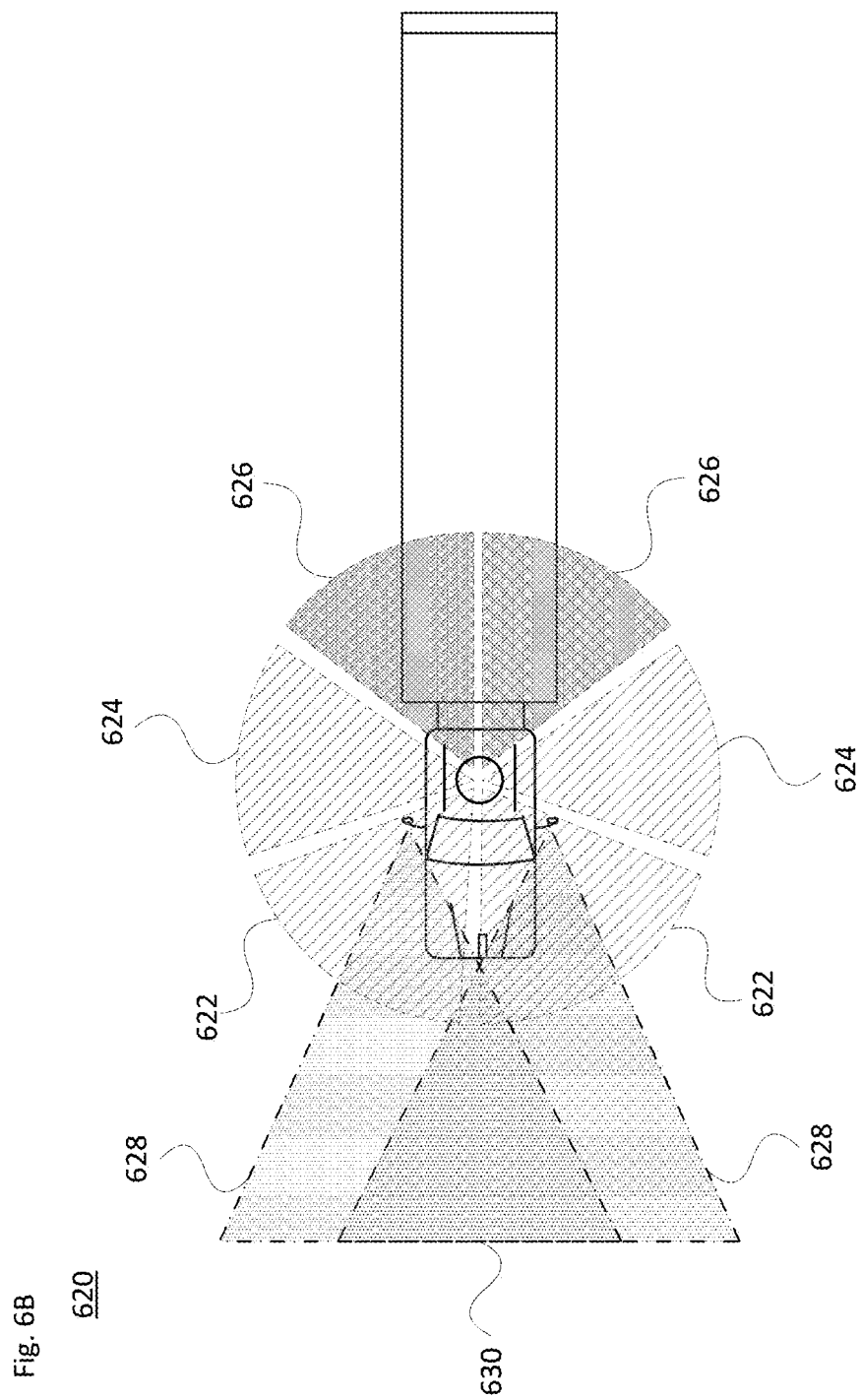

Examples of Lidar, camera and radar sensors and their fields of view for a cargo-type vehicle (e.g., vehicle 150 of FIGS. 1C-D) are shown in FIGS. 6A and 6B. In example 600 of FIG. 6A, one or more Lidar units may be located in rooftop sensor housing 602, with other Lidar units in side sensor housings 604. In particular, the rooftop sensor housing 602 may be configured to provide a 360° FOV. A pair of sensor housings 604 may be located on either side of the tractor unit cab, for instance integrated into a side view mirror assembly or along a side door or quarter panel of the cab. In one scenario, long range Lidars may be located along a top or upper area of the sensor housings 602 and 604. The long range Lidar may be configured to see over the hood of the vehicle. And short range Lidars may be located in other portions of the sensor housings 602 and 604. The short range Lidars may be used by the perception system to determine whether an object such as another vehicle, pedestrian, bicyclist, etc. is next to the front or side of the vehicle and take that information into account when determining how to drive or turn. Both types of Lidars may be co-located in the housing, for instance aligned along a common vertical axis.

As illustrated in FIG. 6A, the Lidar(s) in the rooftop sensor housing 602 may have a FOV 606. Here, as shown by region 608, the trailer or other articulating portion of the vehicle may provide signal returns, and may partially or fully block a rearward view of the external environment. Long range Lidars on the left and right sides of the tractor unit have FOV 610. These can encompass significant areas along the sides and front of the vehicle. As shown, there may be an overlap region 612 of their fields of view in front of the vehicle. The overlap region 612 provides the perception system with additional or information about a very important region that is directly in front of the tractor unit. This redundancy also has a safety aspect. Should one of the long range Lidar sensors suffer degradation in performance, the redundancy would still allow for operation in an autonomous mode. Short range Lidars on the left and right sides have smaller FOV 614. A space is shown between different fields of view for clarity in the drawing; however in actuality there may be no break in the coverage. The specific placements of the sensor assemblies and fields of view is merely exemplary, and may different depending on, e.g., the type of vehicle, the size of the vehicle, FOV requirements, etc.

FIG. 6B illustrates an example configuration 620 for either (or both) of radar and camera sensors in a rooftop housing and on both sides of a tractor-trailer, such as vehicle 150 of FIGS. 1C-D. Here, there may be multiple radar and/or camera sensors in each of the sensor housings 602 and 604 of FIG. 6A. As shown, there may be sensors in the rooftop housing with front FOV 622, side FOV 624 and rear FOV 626. As with region 608, the trailer may impact the ability of the sensor to detect objects behind the vehicle. Sensors in the sensor housings 604 may have forward facing FOV 628 (and side and/or rear fields of view as well). As with the Lidars discussed above with respect to FIG. 6A, the sensors of FIG. 6B may be arranged so that the adjoining fields of view overlap, such as shown by overlapping region 630. The overlap regions here similarly can provide redundancy and have the same benefits should one sensor suffer degradation in performance Example Scenarios As noted above, aspects of the technology involve evaluating information about the vehicle and its external environment to determine observed (and expected) traction while driving in an autonomous mode. This information may be used to manage or alter current driving operations. It may also be used to modify or re-plan an upcoming portion of the route.

Traction information may be obtained in various ways. For instance, as discussed below, the vehicle may be controlled to operate in a specific manner during predefined scenarios, which may include one or more braking and/or acceleration operations along a particular portion of the roadway. This may be considered an active testing approach. Or, alternatively or in conjunction with the active approach, the system may gather traction-related information during different driving activities. This may be considered a passive testing approach.

By way of example, in one active testing scenario when the vehicle is driving along a straight pathway or otherwise constant trajectory and there are no other nearby vehicles or other objects, the system may initiate braking or increase a braking level until feedback from the deceleration system (e.g., ABS braking component) indicates that the wheels are starting to lose traction with the road surface. This includes applying the brakes one or more times for a selected period of time (e.g., 0.1-2.0 seconds, or more or less).

For this type of active testing scenario, the limitation regarding nearby vehicles or other objects may focus on objects behind the vehicle. For instance, the system may require a minimum amount of headway with a trailing vehicle (the time, based on current rates of speed, between the vehicle and any trailing vehicles) before initiating a brake test. In this case, a minimum amount of time may be, e.g., 3-5 seconds or more. Alternatively, the system may set a minimum distance threshold of, e.g., 30-80 meters, or more.

In another active testing scenario, the vehicle may select an amount of acceleration from a standstill. This may occur, by way of example, at a stop sign or stop light. Once the vehicle begins to accelerate, the system may detect whether the tires are spinning. Depending on the conditions, this type of situation may also be easier or harder to regain control if slippage occurs than in the first active testing scenario.

One example of a passive testing scenario occurs when the vehicle slows down during a typical driving procedure, such as to brake for a red light or upcoming stop sign. Another example of a passive testing scenario would be slowing down during a turning operation. In either case, the system may detect the performance of the tires (e.g., slippage, time or distance to full stop, ability to closely follow a trajectory during a turn at normal turning speed) during the passive testing scenario, using techniques described herein.

In any of the active or passive scenarios, one or more braking and/or acceleration actions may be performed. The process may be repeated as warranted to gather more information regarding roadway traction.

Any wheel slippage that is detected in an active or passive test may be used by the on-board computer system to alter driving control for the vehicle in an autonomous driving mode. For example, the vehicle's planner module can use this information to adjust current and future braking, to other driving maneuvers and to select routes.

Sensor data obtained from the on-board sensor suite can assist the planner system. For instance, information obtained from various sensors (e.g., inertial and gyroscope, Lidar, etc. can be used to estimate the vehicle's pose where pose may include, for instance, position, orientation, curvature, change in curvature, longitudinal and lateral acceleration, speed, etc. Acceleration information may be particularly useful, as it relates directly to the road conditions. By way of example, on a dry road it may be assumed the vehicle can brake with a deceleration on the order of 8 $m/s^2$. On wet roads the deceleration may be much less, such as on the order of 5 $m/s^2$. On a snowy road, it may be on the order of 2-3 $m/s^2$, and on ice an even more conservative deceleration on the order of 0.5 $m/s^2$.

The actual (measured) pose of the vehicle on the roadway is derived from a previous pose and the acquired sensor data. The planner module or another part of the on-board computer system can compare the actual pose with the planned (or expected) pose on the roadway. During the active or passive testing operation, if there is no match between these poses, or if there is a detectable discrepancy or other variation in the data, the system may determine that the vehicle has lost traction. One such discrepancy may occur between reported wheel speeds and the vehicle's pose. Other discrepancies may occur in deviations from expected position, orientation and/or speed. By way of example only, the system may flag a discrepancy in longitudinal position if there is at least a 50 cm different between the actual and expected longitudinal positions. Similarly, the system may flag a discrepancy in lateral position if there is at least a 30 cm difference between the actual and expected lateral positions. In another example, if the orientation of the vehicle is off by more than about 1 degree, this may indicate an orientation discrepancy. And in a further example, if the speed differs by more than about 1 m/s, this may also be flagged as a discrepancy. Such discrepancies are merely exemplary.

Figure 7A:
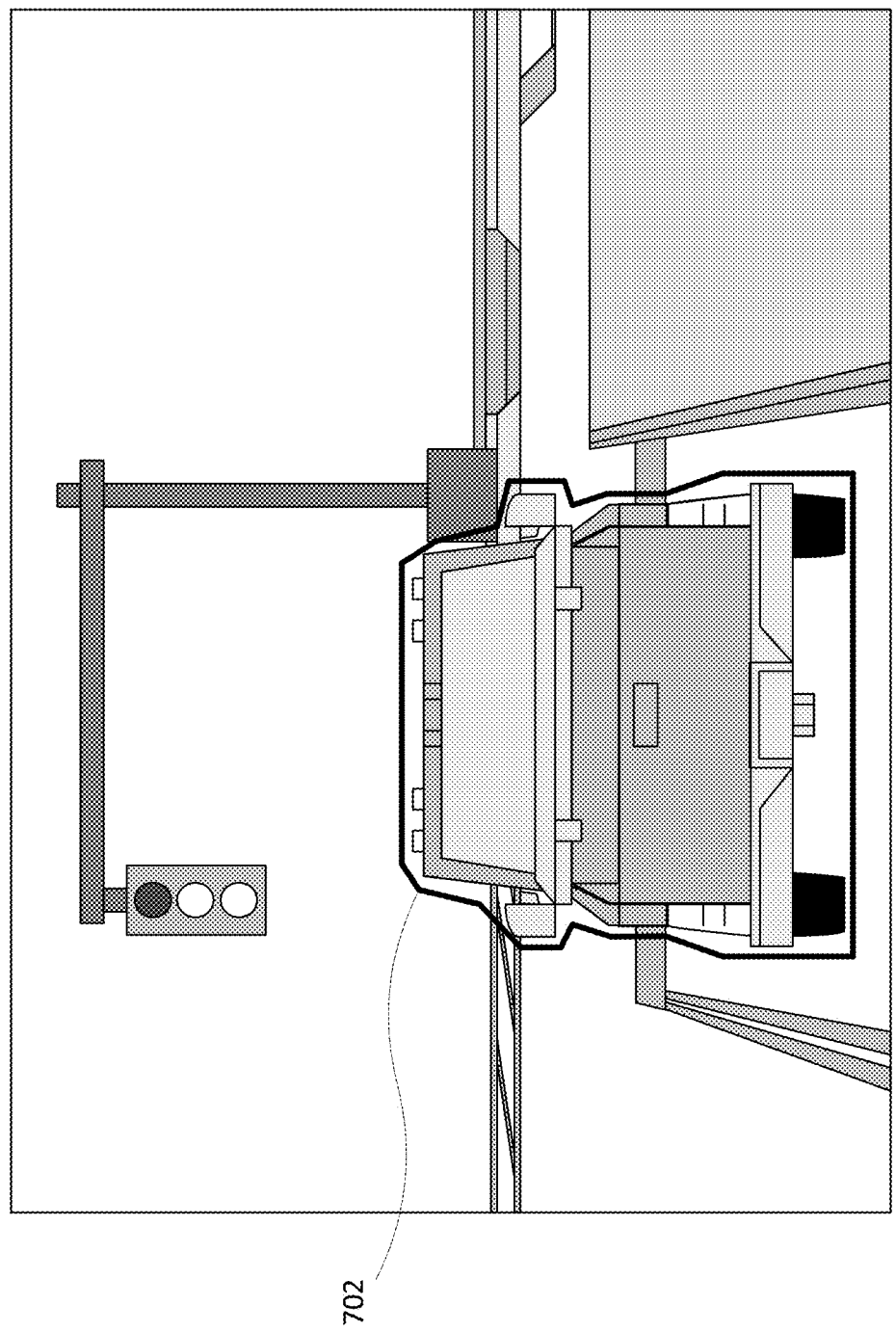
FIGS. 7A-D illustrate an example braking scenario in accordance with aspects of the technology.
Figure 7B:
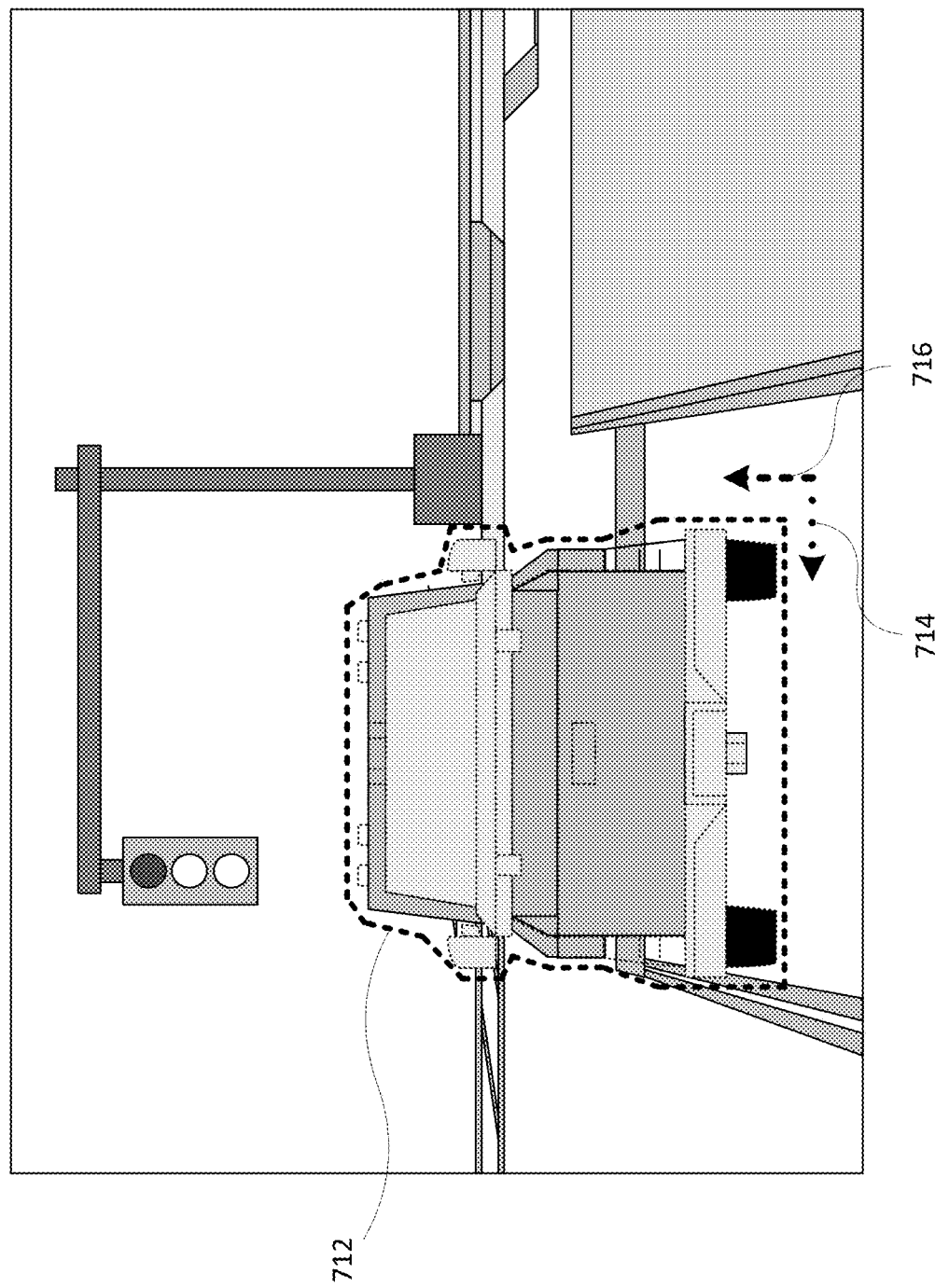
Figure 7D:
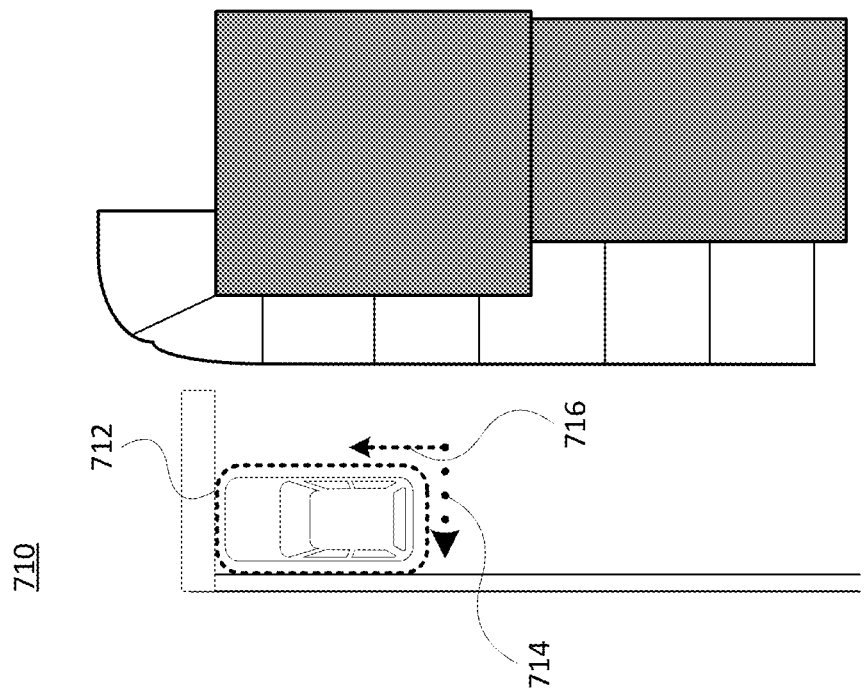
Figure 7C:
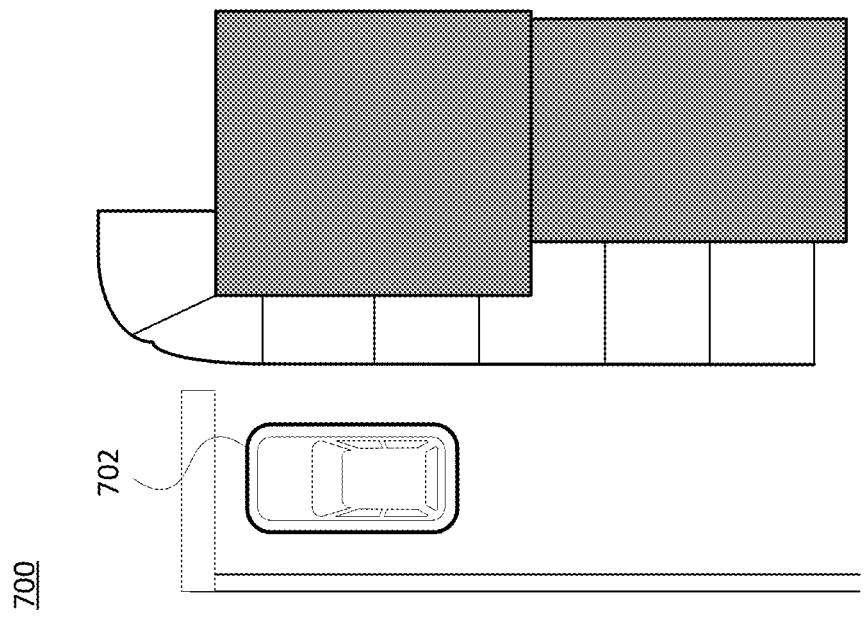

FIGS. 7A-B illustrate one example comparing expected and actual vehicle poses in a braking scenario. For instance, as shown in view 700 of FIG. 7A, as the vehicle approaches a red light, the deceleration system (e.g., 212 in FIG. 2) engages the brakes to cause the vehicle to stop. The on-board system may expect the vehicle to have an expected pose as shown by solid line 702 at a specific point in time. However, the system may detect an actual pose different from the expected pose. This is illustrated in view 710 of FIG. 7B by dotted line 712. This may include, e.g., a difference in lateral and/or longitudinal positioning, and/or a change in the yaw of the vehicle, such as to have the front end point more towards the right or left of the roadway. For instance, dotted arrow 714 illustrates the lateral variance and dashed arrow 716 illustrates the longitudinal variance from what was expected in FIG. 7A. FIGS. 7C-D illustrate eagle-eye views of the expected and actual scene, respectively.

Figure 8A:
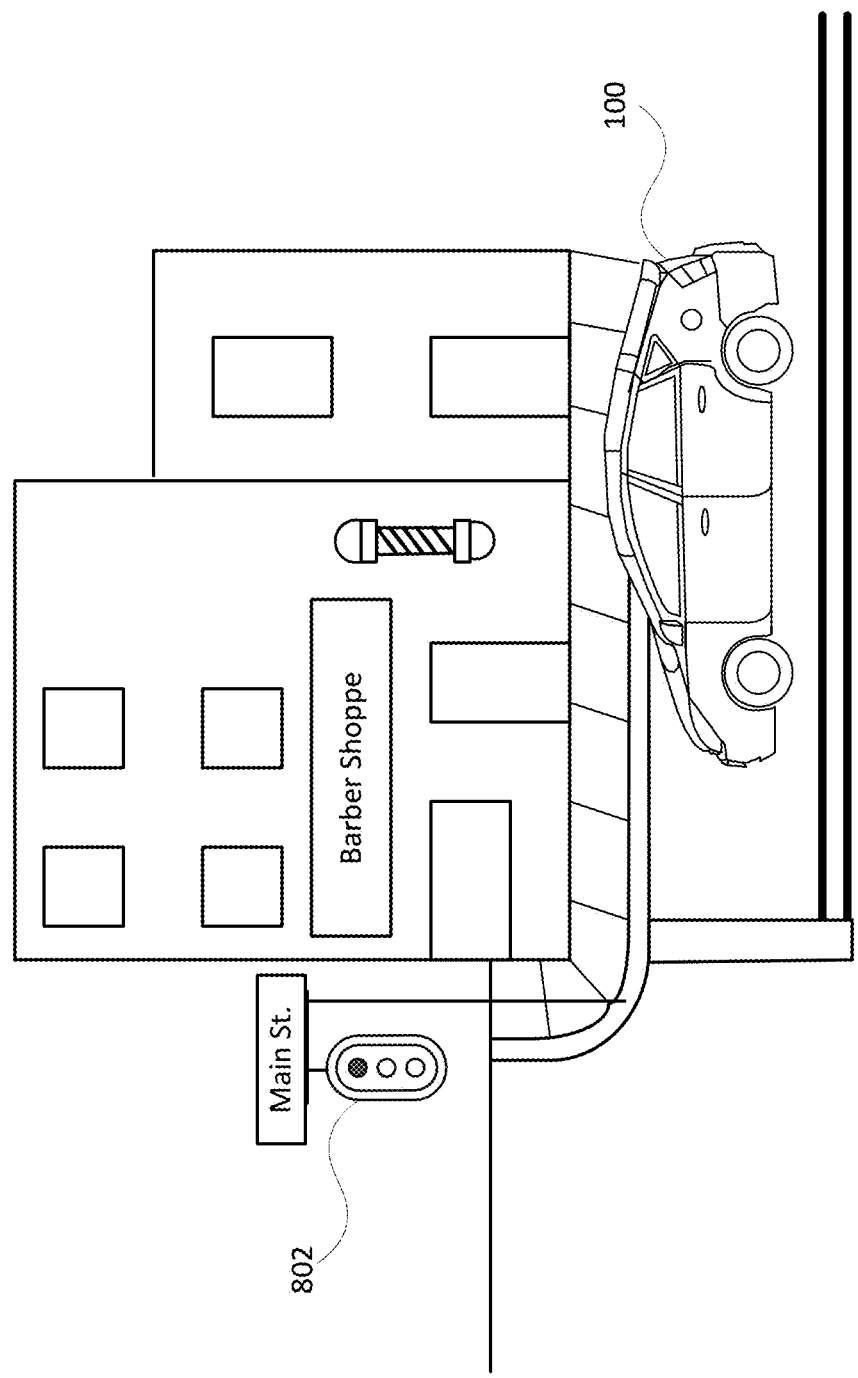
Figure 8D:
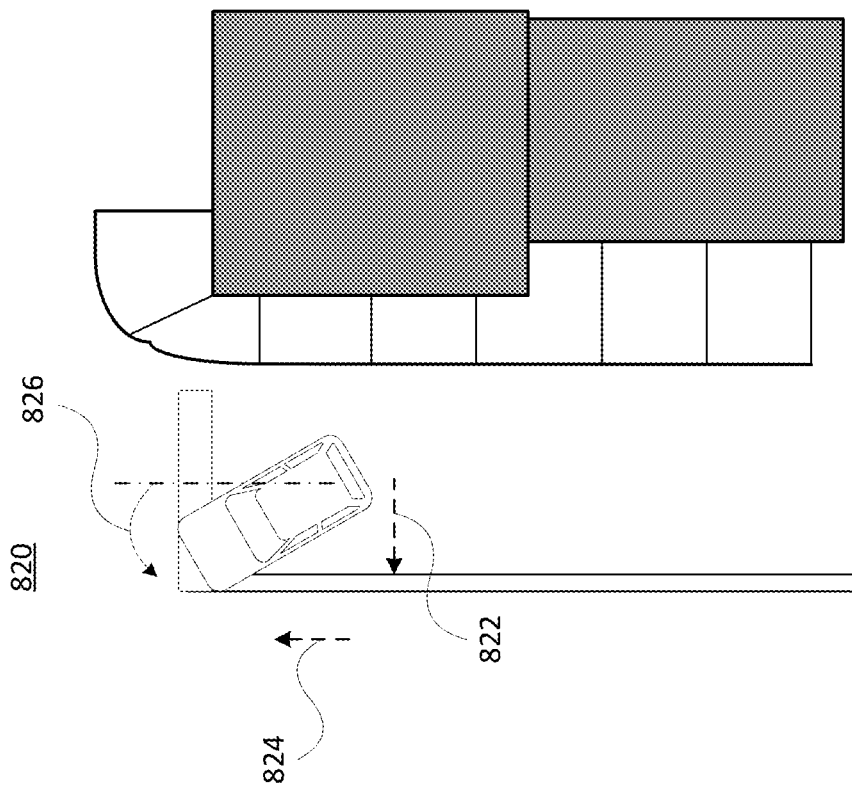
Figure 8C:
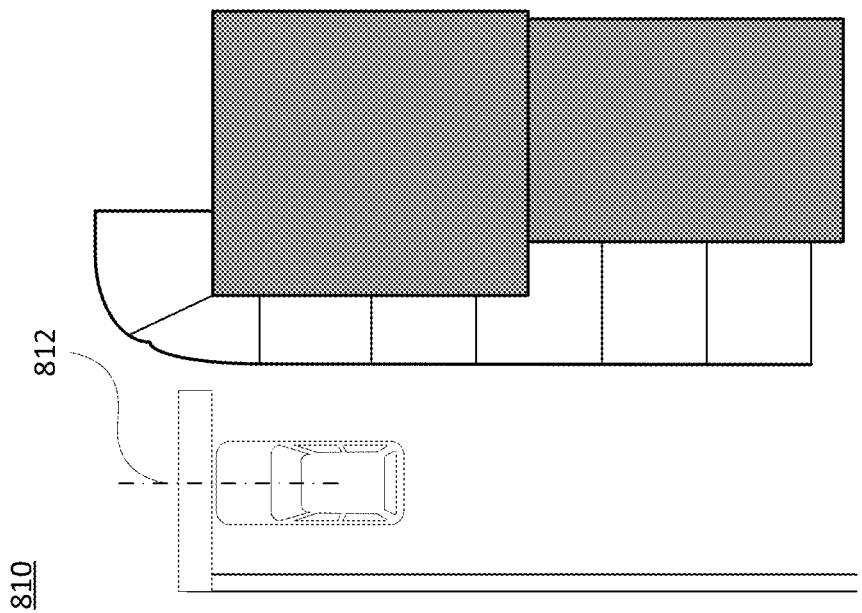

FIGS. 8A-D illustrate an example 800 comparing actual and expected vehicle poses in an acceleration scenario. For instance, FIG. 8A illustrates the vehicle stopped at an intersection while the stoplight is red (802). Once the stoplight turns green (804), the acceleration system (e.g., 214 in FIG. 2) engages, causes the wheels to rotate and the vehicle to move forward, as shown in FIG. 8B. FIGS. 8C-D illustrate eagle-eye views of the expected and actual scene. In particular, FIG. 8C illustrates expected scene 810, which shows the expected pose of the vehicle in response to the acceleration at a specific point in time. Here, dotted line 812 illustrates a linear path that the vehicle is expected to follow. However, FIG. 8D illustrates actual scene 820, which shows the actual pose of the vehicle at the specific point in time. In this case, dotted arrow 822 illustrates a lateral discrepancy, dotted arrow 824 illustrates a longitudinal discrepancy, and arcuate arrow 826 illustrates yaw of the vehicle to the left. Each of these pieces of information may indicate to the on-board system that the wheels lost traction during the acceleration process.

Figure 9A:
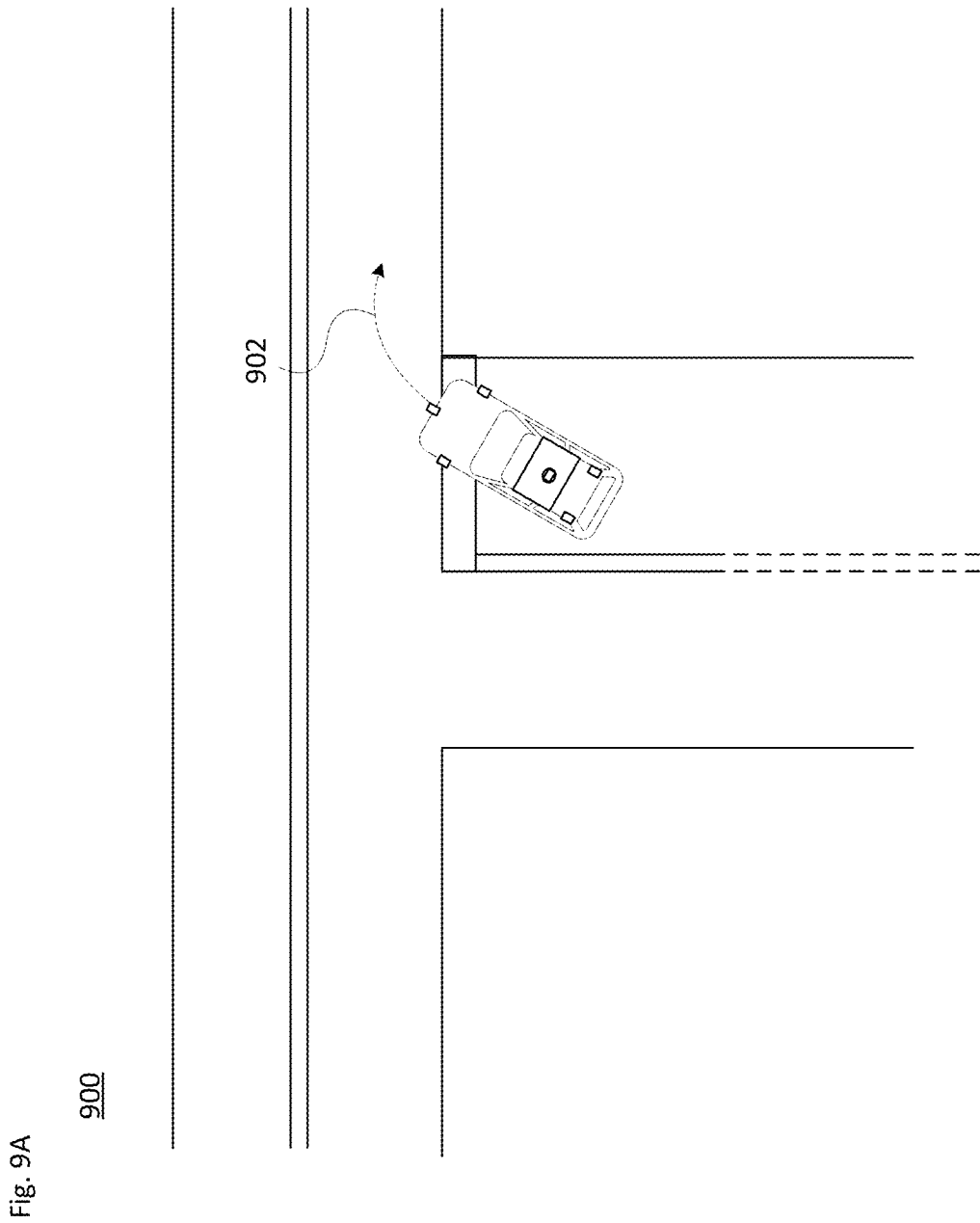
FIGS. 9A-B illustrate an example turning scenario in accordance with aspects of the technology.
Figure 9B:
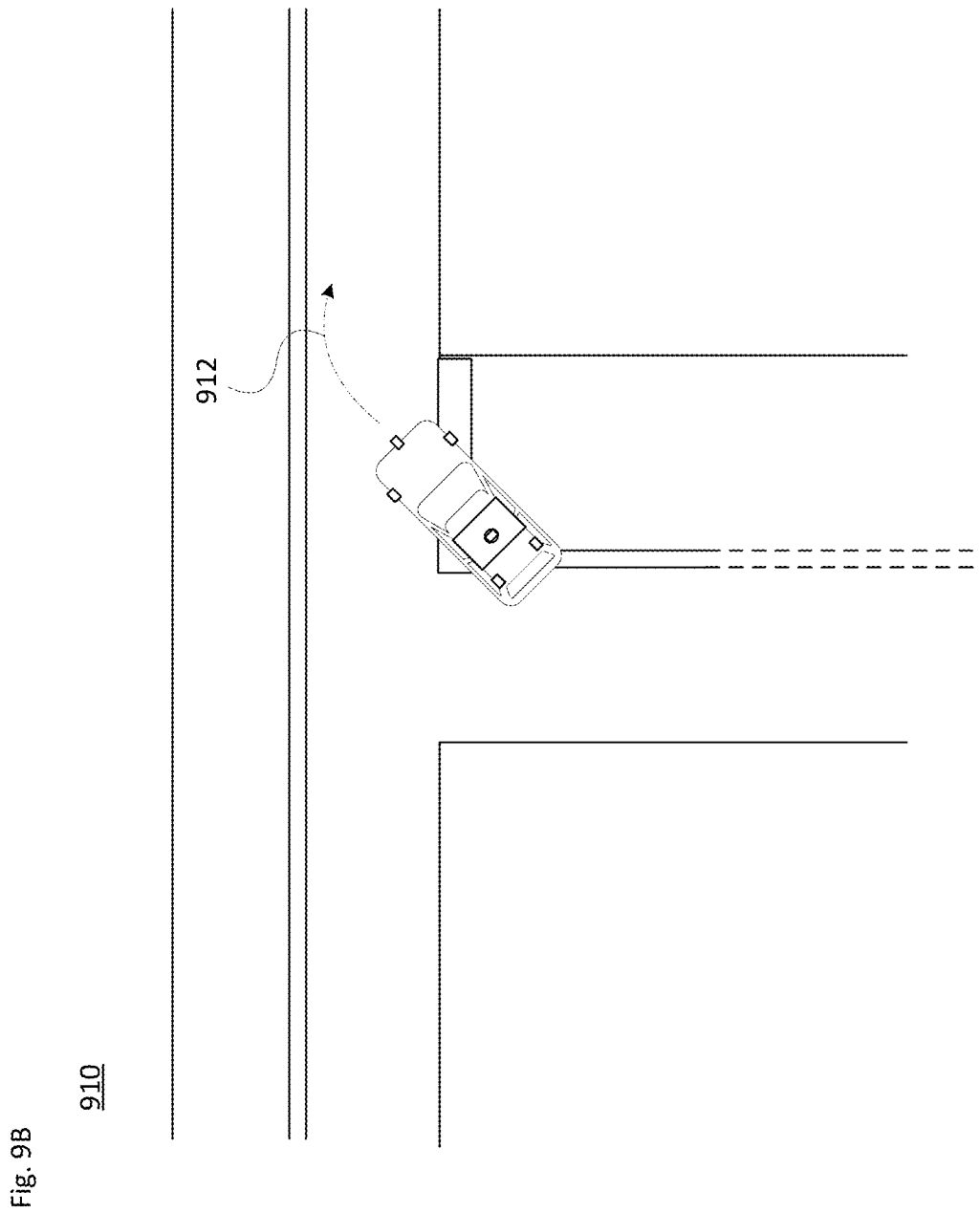

FIGS. 9A-B illustrate a turning example 900. Here, for instance, the vehicle is making a right hand turn at a T intersection. In this example, there may be no stop sign and clear lines of sight, and the vehicle may slow down to make the turn as opposed to initiating the turn from a full stop. In FIG. 9A, dashed arrow 902 illustrates the planned turning path. However, as shown in FIG. 9B, dash-dot arrow 912 illustrates the detected actual turning path from the on-board sensors (e.g., Lidar, radar, camera and/or inertial sensors). As can be seen in FIG. 9B, the vehicle's rear section has swung towards the left, and the turning path has moved closer to the double lines along the main roadway. The detected information in this case may indicate to the on-board system that the front and/or rear wheels lost traction while slowing down for the turn.

The examples in FIGS. 7-9 depict relatively extreme cases where a gross discrepancy in planned and observed pose is measured. In actuality, such discrepancies may be much smaller (or larger) for detecting that the vehicle is slipping due to the various road conditions.

Depending on the specific road conditions and the type of vehicle, the absolute position of the pose may begin to diverge slowly (e.g., over seconds or more). However, the system may be able to detect changes or discrepancies in the higher order terms. For example, if the vehicle's wheels are locked (e.g., no ABS brakes on the vehicle or a brake malfunction), the deceleration system would report that the vehicle is currently traveling at 0 mph or m/s. Nonetheless, the pose velocity would be non-zero and potentially much higher. Similarly, during a turn the difference in measured versus expected yaw rate is potentially more informative than the absolute vehicle orientation.

The results of such determinations may be fed back to the planner module or another part of the vehicle's control system and can be used in various ways. For instance, depending on the amount of determined traction loss, the system may adjust the amount of allowable deceleration (or acceleration) used in trajectory generation along a given portion of the route. If cars or other objects are detected (e.g., via Lidar, radar, cameras or other sensors) ahead of or behind the vehicle, additional headway may be incorporated into the driving plan. Pre-emptive braking may also be performed to avoid a potential collision situation. The braking profile and/or a desired stopping point can also be selected according to the above information.

Figure 10B:
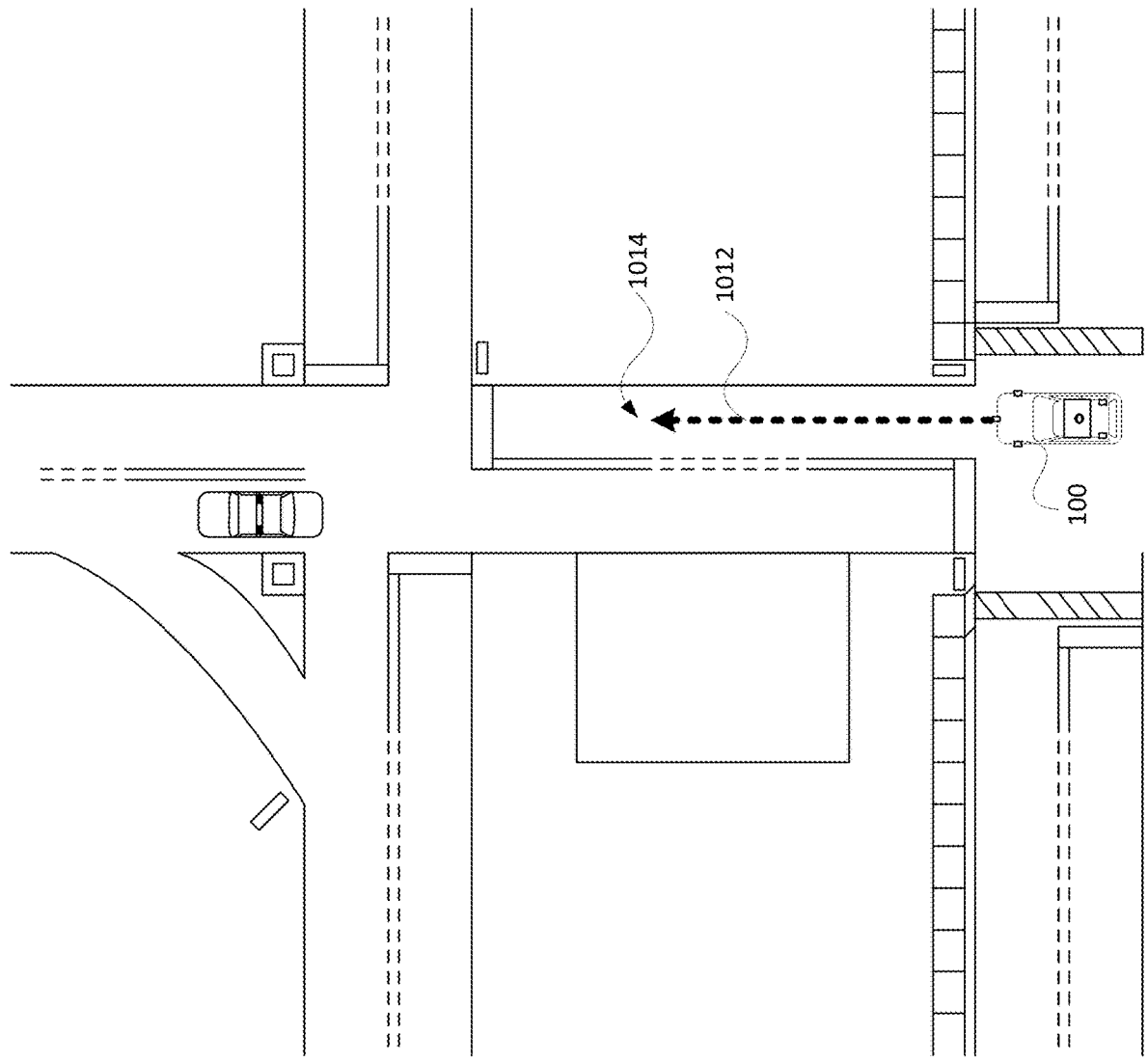

One example of this is shown in FIGS. 10A-B. In particular, FIG. 10A illustrates vehicle 100 approaching an intersection. The planner module may have an initial plan for the vehicle to brake according to a default braking profile as shown by dotted path 1002, to cause the vehicle to arrive at a desired stopping point illustrated by arrow 1004. However, in view of detected, observed or expected reduced traction as discussed above, the planner module may change to a modified plan. For instance, as shown in FIG. 10B, a secondary braking profile shown by dotted path 1012 may be employed to cause the vehicle to arrive at an earlier stopping point illustrated by arrow 1014 that is farther from the intersection than desired stopping point 1004.

FIG. 10C illustrates an example 1020 of contrasting speed profiles. Here, both speed profiles are selected to arrive at the same stopping point. A first speed profile is shown by dashed line 1022. Here, for a first period of time the vehicle's speed is generally constant. Then as the vehicle approaches the stopping point, the default braking profile may be employed to bring the vehicle to a full stop. The second speed profile is shown by dash-dot line 1024. As with the first speed profile, the speed during the first period of time may also be generally constant. However, upon detection of a slippery road condition as shown by arrow 1026, the system may begin active or passive speed reduction. Then at point 1028, the system may more gradually reduce the velocity in order to achieve a full stop at the stopping point. The latter approach of the second speed profile may employ less braking, or braking in advance place where the road is slippery.

Figure 11A:
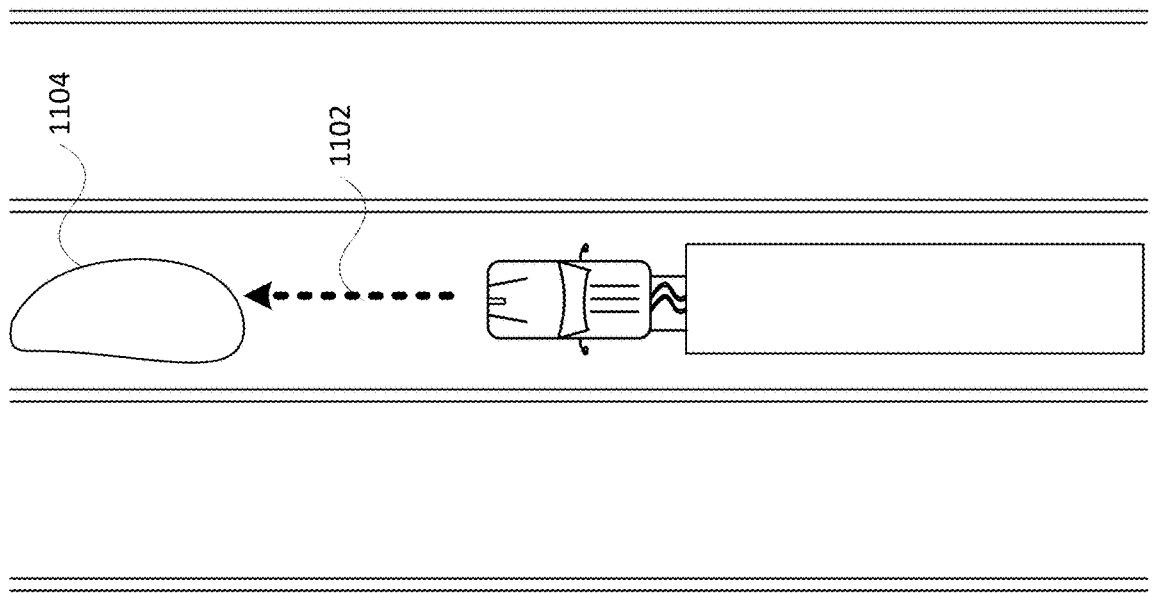
FIGS. 11A-B illustrate an example of route plan modification in accordance with aspects of the technology.
Figure 11B:
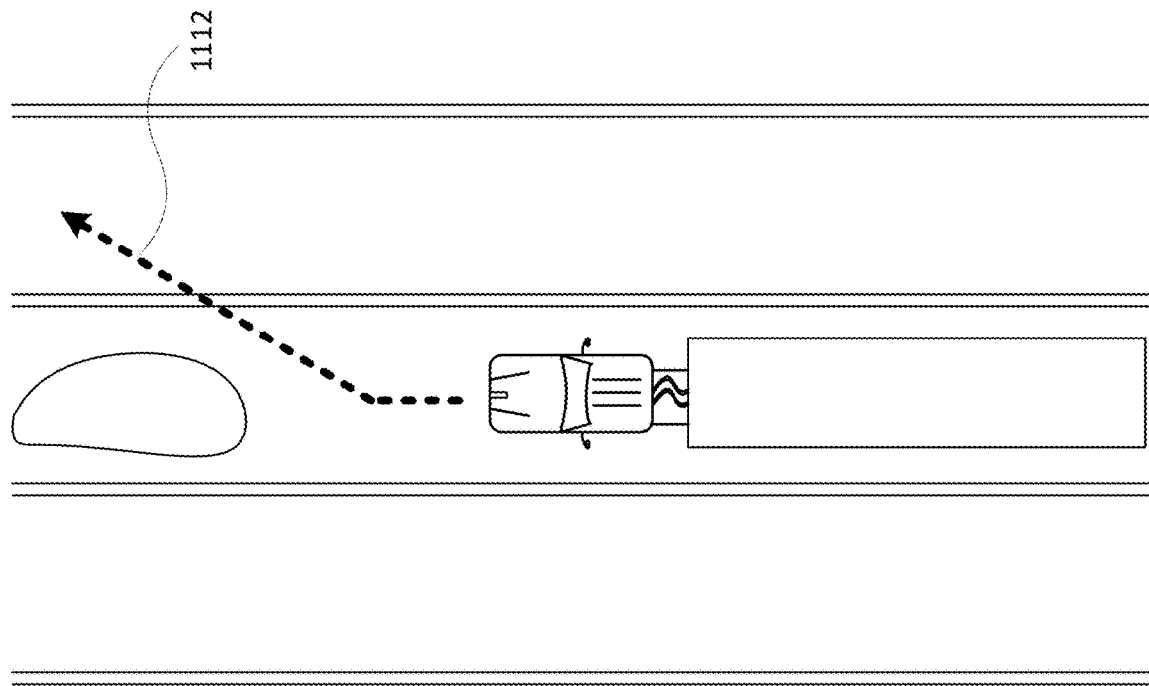

The system may also predict the likelihood of slippage of upcoming sections along the route based on the sensor data. Such a prediction may also factor in other information, such as received weather data, measured temperature and/or humidity information, topographical data from on-board maps, etc., as well as how other vehicles have driven through or along a particular stretch of roadway. An example of this is illustrated in FIGS. 11A-B. In particular, FIG. 11A illustrates a vehicle such as tractor-trailer 150 of FIG. 1C driving along a lane of a freeway. The planner module may have planned for the vehicle to stay in the lane as shown by straight arrow 1102. However, in this example, the vehicle's sensors may detect, or the on-board computer system may receive information from another vehicle or external system that there is ice or some other slippery substance 1104 in the lane ahead. In this case, as shown in FIG. 11B, the planner module alters the path as shown by angled arrow 1112, causing the vehicle's driving systems to change lanes.

Other aspects of the system may involve immediate corrective action and route re-planning. The immediate corrective action may include specific braking techniques or patterns to avoid a skid or to pull out of a skid. And the planner module may make adjustments to the route to avoid or minimize the possibility of slippage. For instance, the vehicle may change lanes to avoid an upcoming icy patch as shown in FIG. 11B, or may take an alternative route that avoids upcoming hilly portions of the roadway. In other examples, route re-planning may include taking a closer or farther exit on the freeway, changing the destination location (e.g., a drop-off point), etc. Still further, the vehicle can drive more slowly where speed is a function of the road conditions, such as 5-10 mph or more below a posted speed. In yet another example, knowing which wheels are slipping would help in mapping the slippery area. Here, the control system (e.g., planner module) could instruct the steering system to make adjustments so that the vehicle moves more to the side of the lane that is not slippery or is less slippery.

Figure 11C:
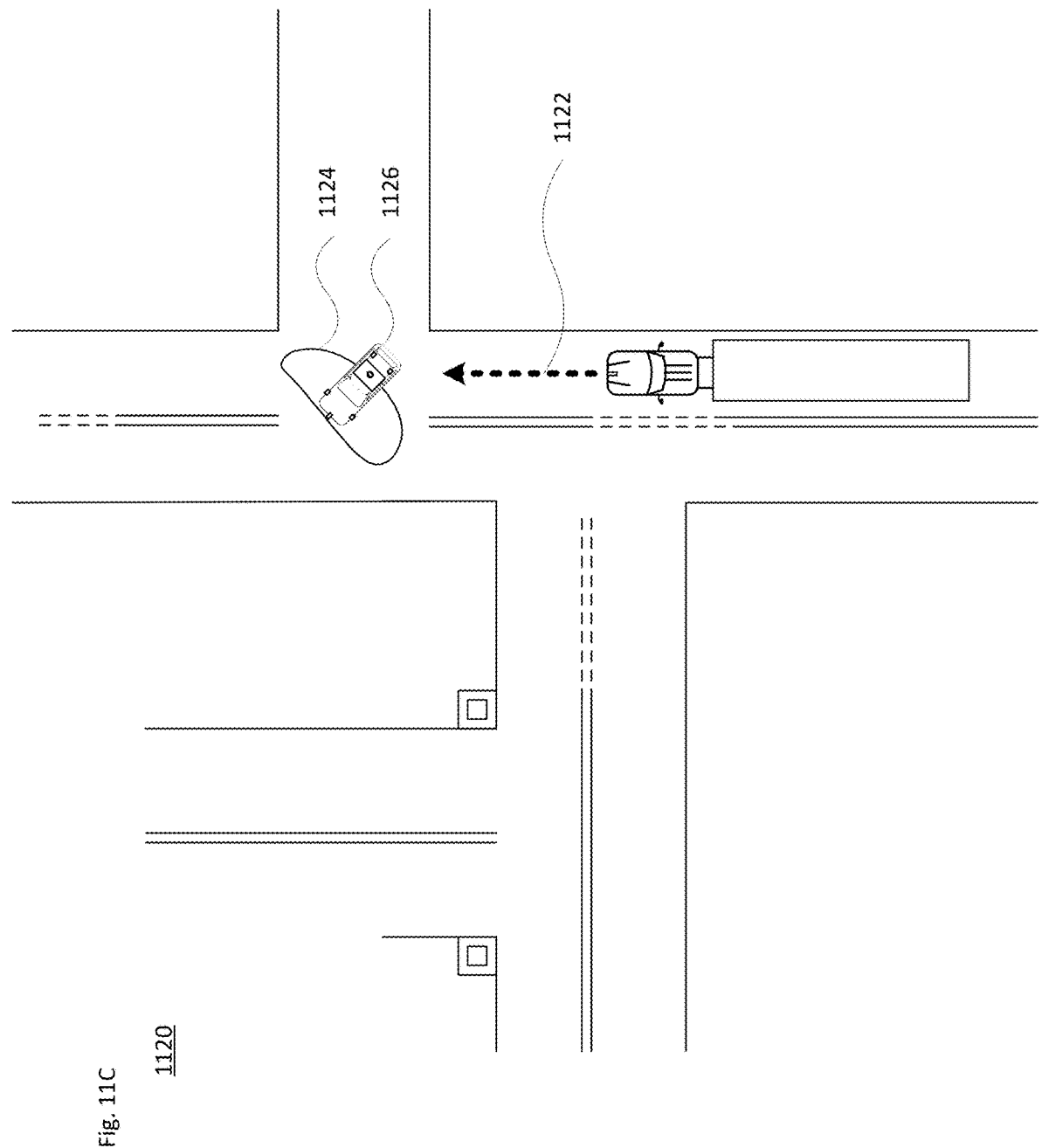

FIGS. 11C-D illustrate an example 1120 of route re-planning due to a slippery condition. As shown in FIG. 11C, the vehicle may detect or be informed of ice or some other slippery area 1124 along the planned route 1122. In this example, additional information, such as observing operation of another vehicle 1126, may support the determination that area 1124 is slippery. For instance, as shown the pitch of the vehicle 1126 may differ from what would be expected. Based on such information, as shown in example 1130 of FIG. 11D, the system plans an alternative route 1132 to avoid the slippery area.

As noted above, the technology is applicable for various types of wheeled vehicles, including passenger cars, buses, RVs and trucks or other cargo carrying vehicles.

In addition to using the wheel slippage information for operation of the vehicle, this information may also be shared with other vehicles, such as vehicles that are part of a fleet. The information can be used for real time map updates, which can also be shared with fleet vehicles.

Figure 12A:
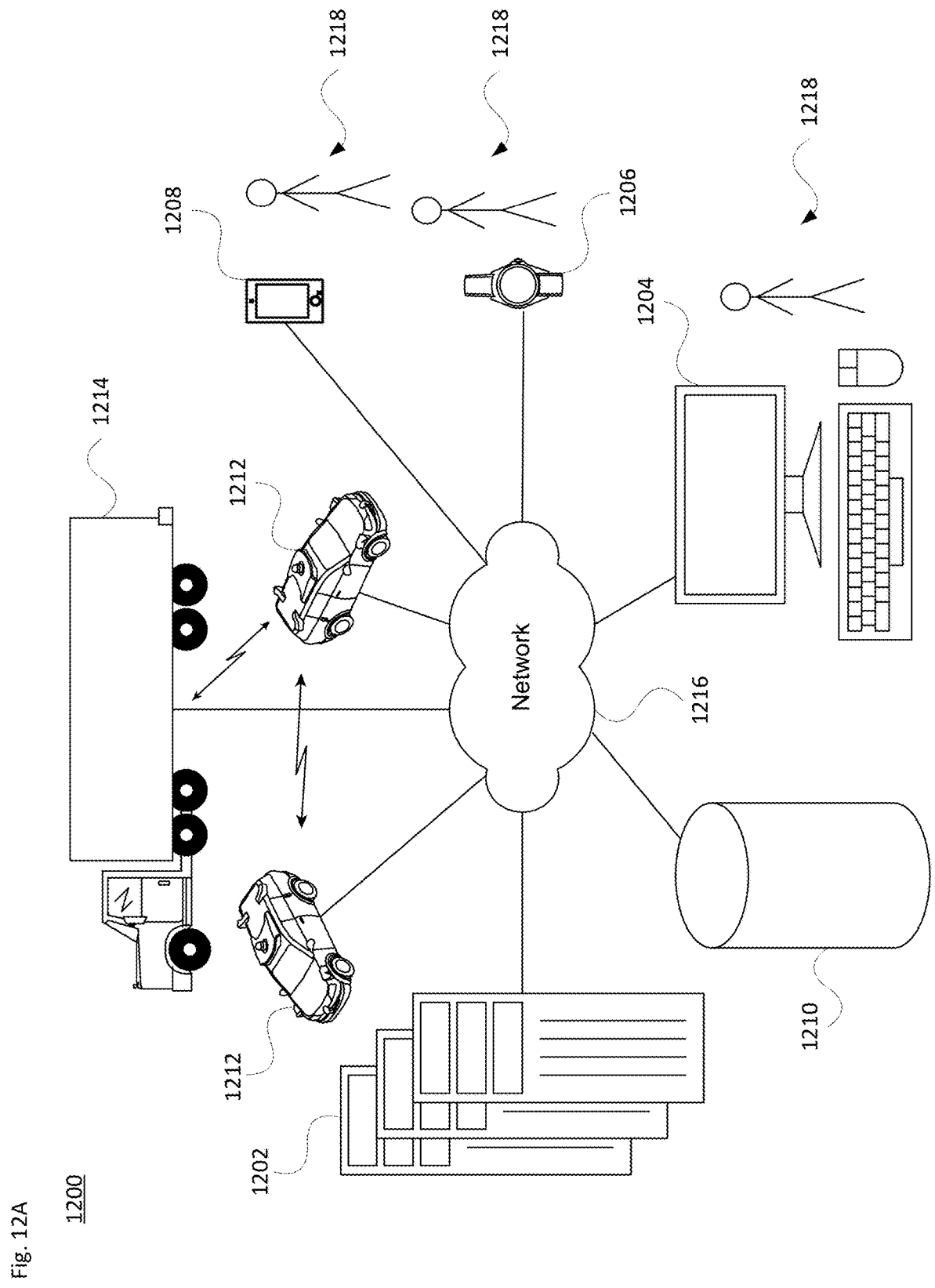
FIGS. 12A-B illustrates an example system in accordance with aspects of the technology.
Figure 12B:
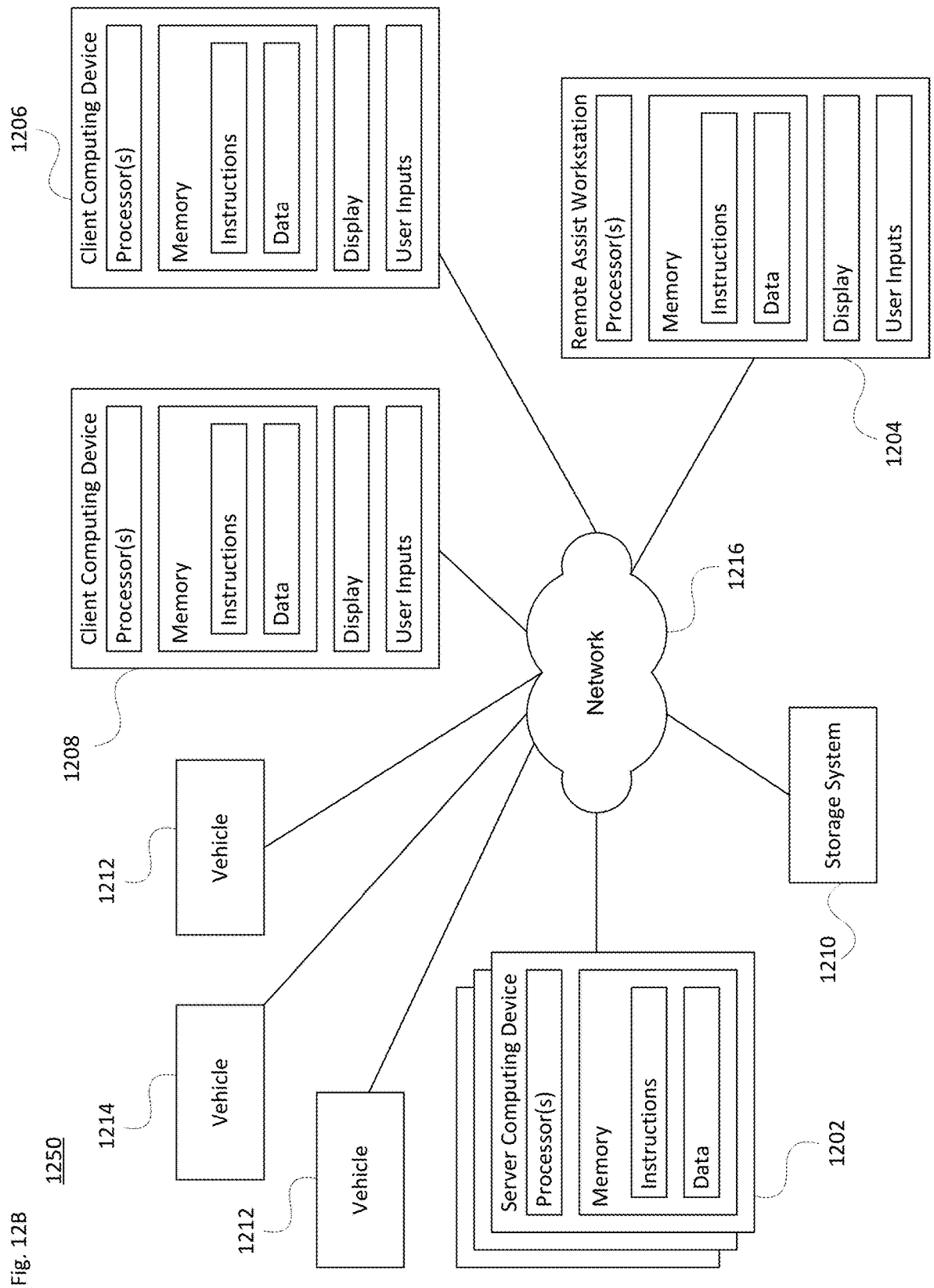

One example of this is shown in FIGS. 12A and 12B. In particular, FIGS. 12A and 12B are pictorial and functional diagrams, respectively, of an example system 1200 that includes a plurality of computing devices 1202, 1204, 1206, 1208 and a storage system 1210 connected via a network 1216. System 1200 also includes vehicles 1212 and 1214, which may be configured the same as or similarly to vehicles 100 and 150 of FIGS. 1A-B and 1C-D, respectively. Vehicles 1212 and/or vehicles 1214 may be part of a fleet of vehicles. Although only a few vehicles and computing devices are depicted for simplicity, a typical system may include significantly more.

As shown in FIG. 12B, each of computing devices 1202, 1204, 1206 and 1208 may include one or more processors, memory, data and instructions. Such processors, memories, data and instructions may be configured similarly to the ones described above with regard to FIG. 2.

The various computing devices and vehicles may communication via one or more networks, such as network 1216. The network 1216, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 1202 may include one or more server computing devices having a plurality of computing devices, e.g., a load balanced server farm, that exchange information with different nodes of a network for the purpose of receiving, processing and transmitting the data to and from other computing devices. For instance, computing device 1202 may include one or more server computing devices that are capable of communicating with the computing devices of vehicles 1212 and/or 1214, as well as computing devices 1204, 1206 and 1208 via the network 1216. For example, vehicles 1212 and/or 1214 may be a part of a fleet of vehicles that can be dispatched by a server computing device to various locations. In this regard, the computing device 1202 may function as a dispatching server computing system which can be used to dispatch vehicles to different locations in order to pick up and drop off passengers or to pick up and deliver cargo. In addition, server computing device 1202 may use network 1216 to transmit and present information to a user of one of the other computing devices or a passenger of a vehicle. In this regard, computing devices 1204, 1206 and 1208 may be considered client computing devices.

As shown in FIG. 12A each client computing device 1204, 1206 and 1208 may be a personal computing device intended for use by a respective user 1218, and have all of the components normally used in connection with a personal computing device including a one or more processors (e.g., a central processing unit (CPU)), memory (e.g., RAM and internal hard drives) storing data and instructions, a display (e.g., a monitor having a screen, a touchscreen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 1206 and 1208 may mobile phones or devices such as a wireless-enabled PDA, a tablet PC, a wearable computing device (e.g., a smartwatch), or a netbook that is capable of obtaining information via the Internet or other networks.

In some examples, client computing device 1204 may be a remote assistance workstation used by an administrator or operator to communicate with passengers of dispatched vehicles. Although only a single remote assistance workstation 1204 is shown in FIGS. 12A-12B, any number of such work stations may be included in a given system. Moreover, although operations work station is depicted as a desktop-type computer, operations works stations may include various types of personal computing devices such as laptops, netbooks, tablet computers, etc.

Storage system 1210 can be of any type of computerized storage capable of storing information accessible by the server computing devices 1202, such as a hard-drive, memory card, ROM, RAM, DVD, CD-ROM, flash drive and/or tape drive. In addition, storage system 1210 may include a distributed storage system where data is stored on a plurality of different storage devices which may be physically located at the same or different geographic locations. Storage system 1210 may be connected to the computing devices via the network 1216 as shown in FIGS. 12A-B, and/or may be directly connected to or incorporated into any of the computing devices.

Storage system 1210 may store various types of information. For instance, the storage system 1210 may also store autonomous vehicle control software which is to be used by vehicles, such as vehicles 1212 or 1214, to operate such vehicles in an autonomous driving mode. Storage system 1210 may store map information, route information, braking and/or acceleration profiles for the vehicles 1212 and 1214, weather information, etc. This information may be shared with the vehicles 1212 and 1214, for instance to help with real-time route planning and traction analysis by the on-board computer system(s). The remote assistance workstation 1204 may access the stored information and use it to assist operation of a single vehicle or a fleet of vehicles. By way of example, a lead vehicle may detect a slippery condition, such as slippery substance 1104 of FIG. 11A, and send information about the slippery condition to the remote assistance workstation 1204. In turn, the remote assistance workstation 1204 may disseminate the information to other vehicles in the fleet, so that they may alter their routes (see, e.g., angled arrow 1112 of FIG. 11B).

Remote assistance may also request one or more vehicles along a given stretch of roadway to perform a passive and/or active traction test, for instance to confirm or validate a prior detection by another vehicle. Thus, if road conditions improve (e.g., due to an increase in temperature that melts ice on the road) or worsen (e.g., due to an accumulation of snow), remote assistance can inform other vehicles of the fleet accordingly.

In a situation where there are passengers, the vehicle or remote assistance may communicate directly or indirectly with the passengers' client computing device. Here, for example, information may be provided to the passengers regarding current driving operations, changes to the route in response to the situation, etc.

Figure 13:
FIG. 13 illustrates an example method in accordance with aspects of the technology.

FIG. 13 illustrates an example method of operation 1300 in accordance with the above discussions. For instance, at block 1302 one or more processors of the vehicle cause a subsystem of the vehicle to actuate one or more components of the subsystem while in an autonomous driving mode. This may include, by way of example, actuating part of the deceleration system (e.g., 212 in FIG. 2), the acceleration system (e.g., 214 in FIG. 2), or the steering system (e.g., 216 in FIG. 2). At block 1304, pose information of the vehicle is obtained during actuation of the one or more components.

Based on this pose information, at block 1306 the system determines an actual pose of the vehicle. At block 1308 the actual pose information is compared with an expected pose. The expected pose may be generated, e.g., by the vehicle's planner module. In view of this, at block 1310 the system determines a difference between the actual pose and the expected pose. For instance, the difference may reflect a variance (delta) in a relative distance to another object, in an orientation (e.g., yaw), a direction of travel, etc. At block 1312, based on this difference, the system determines a slippage of one or more wheels of the vehicle. In one example, the difference may need to exceed a threshold value before the system determines that wheel slippage has occurred. In this case, the threshold value may be, e.g., a percentage deviation from an expected baseline (e.g., 2-5% or more or less), a physical distance delta (e.g., greater than 0.2-0.5 m), or some other factor. Thus, one way slippage can be determined is by the difference exceeding a threshold value. The difference can also be used in other ways, such as in a lookup table with fixed difference values correlating to slippage. Other aspects may employ a machine learning approach or other model to determine that the difference indicates that slippage has occurred. Then, at block 1314, the system performs at least one of a corrective driving action or a route re-planning action in response to the determined slippage.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements. The processes or other operations may be performed in a different order or simultaneously, unless expressly indicated otherwise herein.

The invention claimed is:

1. A method of operating a vehicle in an autonomous driving mode to detect a traction condition, the method comprising:

causing, by one or more processors of the vehicle, a subsystem of the vehicle to actuate one or more components of the subsystem during operation in the autonomous driving mode on a roadway;

obtaining, by the one or more processors from one or more sensors of a perception system of the vehicle, pose information of the vehicle during actuation of the one or more components of the subsystem;

determining, by the one or more processors, an actual pose of the vehicle on the roadway according to the obtained pose information;

comparing, by the one or more processors, the actual pose with an expected pose of the vehicle on the roadway;

determining, by the one or more processors, a difference between the actual pose and the expected pose based on the comparison;

determining, by the one or more processors, whether a slippage of one or more wheels of the vehicle has occurred based on the difference; and either causing, by the one or more processors, at least one of a corrective driving action or a route re-planning action associated with the vehicle when the slippage is determined to have occurred and the difference exceeds a threshold, wherein the corrective driving action includes at least one of performing a selected braking technique or reducing a driving speed along a selected portion of roadway.

2. The method of claim 1, wherein the corrective driving action further includes performing a selected braking pattern.

3. The method of claim 1, wherein the corrective driving action further includes adjusting at least one of a braking profile or a desired stopping point for the vehicle.

4. The method of claim 1, wherein reducing the driving speed along the selected portion of roadway comprises reducing a maximum driving speed along the selected portion of roadway.

5. The method of claim 1, wherein the corrective driving action is performed based on the actual pose.

6. The method of claim 1, wherein the route re-planning action includes at least one of maneuvering to a different lane on a roadway or selecting an alternate route.

7. The method of claim 1, wherein causing the route re-planning action includes predicting a likelihood of slippage at an upcoming section of a current route.

8. The method of claim 1, wherein a given one of the one or more components is:
a braking component and the subsystem is a deceleration system;
an acceleration component and the subsystem is an acceleration system; or a
steering component and the subsystem is a steering system.

9. The method of claim 1, wherein determining whether the slippage of one or more wheels of the vehicle has occurred based on the difference further includes determining that the difference exceeds the threshold.

10. The method of claim 1, wherein the difference indicates a variance in an orientation of the vehicle.

11. The method of claim 1, wherein causing the subsystem of the vehicle to actuate one or more components of the subsystem includes performing at least one of a braking operation or an acceleration operation during operation in the autonomous driving mode.

12. The method of claim 1, further comprising transmitting information about the slippage to at least one of another vehicle or a remote fleet management system.

13. A vehicle configured to operate in an autonomous driving mode, the vehicle comprising:

a driving system including a steering subsystem, an acceleration subsystem and a deceleration subsystem to control driving of the vehicle in the autonomous driving mode on a roadway;

a perception system including one or more sensors configured to detect objects in an environment external to the vehicle;

a positioning system configured to determine a current position of the vehicle; and a control system including one or more processors, the control system operatively coupled to the driving system, the perception system and the positioning system, the control system being configured to:

cause a subsystem of the vehicle to actuate one or more components of the subsystem during operation in the autonomous driving mode;

obtain, from at least one of the positioning system and the one or more sensors of the perception system, pose information of the vehicle during actuation of the one or more components of the subsystem;

determine an actual pose of the vehicle on the roadway according to the obtained pose information;

compare the actual pose with an expected pose of the vehicle on the roadway; determine a difference between the actual pose and the expected pose based on the comparison;

determine whether a slippage of one or more wheels of the vehicle has occurred based on the difference; and either cause the driving system to take a corrective driving action or perform a route re-planning action associated with the vehicle when the slippage is determined to have occurred and the difference exceeds a threshold, wherein the corrective driving action includes the deceleration subsystem performing a selected braking technique or includes reducing a driving speed along a selected portion of roadway.

14. The vehicle of claim 13, wherein the corrective driving action further includes the deceleration subsystem performing a selected braking pattern.

15. The vehicle of claim 13, wherein the corrective driving action further includes adjusting at least one of a braking profile or a desired stopping point for the vehicle.

16. The vehicle of claim 13, wherein reducing the driving speed along the selected portion of roadway comprises reducing a maximum driving speed along the selected portion of roadway.

17. The vehicle of claim 13, wherein the route re-planning action includes at least one of:
maneuvering to a different lane on a roadway or selecting an alternate route; or
predicting a likelihood of slippage at an upcoming section of a current route.

18. The vehicle of claim 13, wherein a given one of the one or more components is:
a braking component and the subsystem is the deceleration subsystem;
an acceleration component and the subsystem is the acceleration subsystem; or a
steering component and the subsystem is the steering subsystem.

19. The vehicle of claim 13, further comprising a communication system configured to transmit information about the slippage to at least one of another vehicle or a remote fleet management system.

* * * * *